(12) United States Patent
Bingel et al.

(10) Patent No.: US 6,744,883 B1
(45) Date of Patent: Jun. 1, 2004

(54) FILTER SYSTEM AND METHOD TO SUPPRESS INTERFERENCE IMPOSED UPON A FREQUENCY-DIVISION MULTIPLEXED CHANNEL

(75) Inventors: Thomas J. Bingel, Belleair Beach, FL (US); Gordon Bremer, Largo, FL (US); Ramon B. Hazen, N Redington Beach, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/479,519

(22) Filed: Jan. 7, 2000

Related U.S. Application Data

(60) Provisional application No. 60/115,598, filed on Jan. 12, 1999.

(51) Int. Cl.[7] .......................... H04M 1/00; H04M 11/00
(52) U.S. Cl. ........................ 379/399.01; 379/93.05; 379/106.09
(58) Field of Search ................. 379/93.01, 93.05, 379/93.07, 93.14, 387.01, 399.01, 106.05, 106.09, 392.01; 370/210, 352, 480, 488, 497; 375/148, 335, 346; 725/106, 127; 333/181–182; 327/310–311; 455/326

(56) References Cited

U.S. PATENT DOCUMENTS

| | | | | |
|---|---|---|---|---|
| 4,223,282 A | | 9/1980 | de Boer ........................ 332/10 |
| 4,256,975 A | * | 3/1981 | Fukushima et al. ......... 327/311 |
| 4,533,970 A | | 8/1985 | Brown ........................ 361/58 |
| 4,613,978 A | * | 9/1986 | Kurth et al. ................. 375/346 |
| 5,673,325 A | | 9/1997 | Andrea et al. ................. 381/92 |
| 5,930,231 A | * | 7/1999 | Miller et al. ................. 370/210 |
| 5,974,139 A | | 10/1999 | McNamara et al. ......... 379/399 |
| 5,982,253 A | * | 11/1999 | Perrin et al. ................. 333/182 |
| 5,995,819 A | * | 11/1999 | Yamaji et al. ............... 455/326 |
| 6,144,399 A | * | 11/2000 | Manchester et al. ........ 725/127 |
| 6,144,735 A | * | 11/2000 | Bella ..................... 379/399.01 |
| 6,219,376 B1 | * | 4/2001 | Zhodzishsky et al. ...... 375/148 |
| 6,243,446 B1 | * | 6/2001 | Goodman ................ 379/93.01 |
| 6,418,221 B1 | * | 7/2002 | Snow et al. ........... 379/399.01 |

* cited by examiner

*Primary Examiner*—George Eng
(74) *Attorney, Agent, or Firm*—Thomas, Kayden, Horstemeyer & Risley

(57) ABSTRACT

A filter system (and associated filtering method) is disclosed, the filter system being connected between a large-amplitude, high-frequency noise source and a frequency-division multiplexed communications channel. The large-amplitude, high-frequency noise commonly being a POTS (plain old telephone service) ring signal generated by a CO (central office) telephone switch. The frequency-division multiplexed communications channel generally used to carry digital signals at frequencies above the POTS baseband in order to implement a digital subscriber line (DSL). Large-amplitude, high-frequency signal components from the POTS ring signal impair the performance of frequency-division multiplexed channels on a transmission line such as a subscriber loop. The filter system of the present invention utilizes amplitude and also may utilize frequency to selectively suppress the transients and harmonics on the transmission line caused by a telephone ring signal. In addition, the present invention uses bidirectional current limiting filters to implement some of the amplitude-dependent filtering behavior.

22 Claims, 16 Drawing Sheets

FILTER SYSTEM AND METHOD TO SUPPRESS INTERFERENCE IMPOSED UPON A FREQUENCY-DIVISION MULTIPLEXED CHANNEL

CLAIM OF PRIORITY

This document claims priority to and the benefit of the filing date of commonly assigned Provisional Application entitled, "XDSL POTS FILTER WITHOUT MAGNETICS," filed Jan. 12, 1999, now abandoned, and accorded Ser. No. 60/115,598. The foregoing provisional application is hereby incorporated herein by reference in its entirety.

FIELD OF THE INVENTION

The present invention relates generally to the arts of data communications and telephony, and more particularly, to a filter system (and associated methodology) for connection between a source of large-amplitude, high-frequency noise and at least one broadband communications channel which is frequency-division multiplexed into a communications medium of a communications system.

BACKGROUND OF THE INVENTION

With the increasing bandwidth demands from the advent of the Internet, service providers have looked for ways to increase data performance over the two-wire, copper twisted-pair, transmission lines that connect the telephone central offices (COs) to the customer premises (CPs). The telephone system architecture connects customer premises equipment (CPE) to CO switches over transmission lines known as "local loops," "subscriber loops," "loops," or the "last mile" of the telephone network. These loops are part of the cable plant that provides the physical means by which transmission services are implemented. To allow connectivity between COs, the CO switches are interconnected to each other over high-capacity, multiplexed transmission facilities known as trunk lines. Unlike the CO-to-CO trunk connections, which have generally been digital for some time, digital service provision to the customer premises is a more recent development. These digital CO-to-CO trunk connections are part of a telephone network architecture known as integrated services digital network (ISDN).

Historically, the PSTN (public switched telephone network) evolved with analog, subscriber loops connected to a telephone network with circuit-switched capabilities which were designed to carry voice communications. The evolution of the telephone network from a system just designed to carry analog, voice communications to a system which could carry digital voice and data led to the development of the ISDN architecture. One of the goals of the ISDN architecture is to provide customers (or subscribers) with integrated access (over a single loop) to the services of a digital network.

Because of the costs of replacing or supplementing the cable plant to the customer premises, technologies are needed that utilize existing subscriber loops to provide digital connectivity to the customer. Furthermore, to provide customers with additional flexibility and enhanced services, multiplexing techniques are needed to fill a physical subscriber loop with multiple logical channels. In contrast to the ubiquitous use of frequency-division multiplexing (FDM) and/or time-division multiplexing (TDM) on CO-to-CO trunk connections, the standard analog POTS (plain old telephone service) capability provided over subscriber loops generally has not been multiplexed with any other channels. To solve the problems of digital connectivity and multiple channels of communication, subscriber loops capable of carrying digital channels have been developed and are known as digital subscriber lines (DSLs). Logical channels within a subscriber line which carry digital signals are known as DSL channels while logical channels within a subscriber line which carry POTS signals are known as POTS channels.

Frequency-division multiplexing modulates (or frequency shifts) signals to different frequency channels before placing them on the communications medium. This modulation of signals to higher frequency ranges creates a broadband signal which has been frequency shifted to a different frequency band than the base band frequencies (or baseband) of the signal. A communications channel associated with a broadband signal is known as a broadband channel, while a communications channel associated with a baseband signal is known as a baseband channel. The equipment that MOdulates and DEModulates signals onto a communications medium is called a MODEM. Broadband is an adjective often used to describe equipment, networks, and systems that use FDM to modulate signals, while narrowband is an adjective often used to describe equipment, networks, and systems that do not modulate signals out of their base frequency bandwidth range. Digital signals that utilize square waveforms theoretically use an infinite frequency spectrum which limits the practicality of using FDM to multiplex other signals onto the same communications medium with a square waveform signal. In contrast to FDM, the bandwidth of a communications medium is broken up into time-slots in TDM.

One of the initial DSL solutions is the service of narrowband ISDN which has several drawbacks. For example, although the narrowband ISDN BRI (Basic Rate Interface) service communicates three logical channels over a subscriber loop, it does not allow direct compatibility with POTS because the narrowband ISDN channels occupy the baseband frequencies (0–4 KHz) that are used by POTS to carry a voice frequency (VF) channel. Because narrowband ISDN uses the frequency baseband of POTS, voice service over a narrowband ISDN DSL requires the use of actively powered terminal adapters (TAs) to provide POTS functionality by utilizing one of the logical channels in the narrowband ISDN DSL.

As a result of some of the drawbacks from narrowband ISDN, and as a result of the customer demand for increased bandwidth, newer DSL (digital subscriber line) technologies have been developed. Some of these newer DSL technologies use frequency-division multiplexing and/or time-division multiplexing to provide a higher-bandwidth digital service over a local subscriber loop without significantly interfering with standard POTS functionality. This backward compatibility with standard POTS functionality offers easier and lower cost customer migration to the newer DSL technologies without the previously mentioned drawbacks of narrowband ISDN. The newer DSL technologies accomplish this functionality by modulating their broadband, digital signal above (at higher frequencies than) the 0 KHz to 4 KHz baseband of standard, analog POTS signals. This FDM capability to provide multiple channels on a single subscriber line will work with both baseband and broadband analog signals as well as with baseband and broadband digital signals. However, the common existence of older, legacy, analog POTS loops and equipment coupled with the demand for newer, digital service has caused the development of new DSL technologies that allow a new, digital channel to be frequency-division multiplexed above an old, analog POTS channel. Several variants of new DSL technology exist, e.g., ADSL, SDSL, RADSL, VADSL, etc., with such variants generally referred to collectively as xDSL. Generally, when multiple channels are communicated across an xDSL connection, a POTS splitter is utilized to decouple the frequency-division multiplexed channels. A POTS splitter usually is situated at the CO as well as at the customer premises.

Although the transmission of both digital broadband and analog POTS baseband signals over a subscriber loop between a CO telephone switch and a customer premises offers many potential advantages for customers, several practical problems must be solved in implementing DSL solutions. One significant problem results from the high-frequency transient noise signals generated by the legacy, analog POTS equipment connected to the subscriber loop. These transient signals from the POTS equipment are in frequency ranges above the POTS baseband and have components which interfere with the one or more broadband channels. Many functions of the legacy POTS equipment generate these high-frequency noise components.

Historically, the POTS subscriber loop was designed with the functions needed to communicate both baseband, voice-conversation signals and call-state/line-state signaling information (known generally as subscriber loop signaling or POTS loop signaling as opposed to CO-to-CO trunk signaling). Although POTS is a service deployed by the telephone company, it also can be viewed as defining an interface standard that specifies how to communicate both baseband, analog voice conversations and subscriber loop signaling information. Because call-state/line-state signaling messages are different for a CO switch and a telephone, a CO switch usually implements a CO-side or office-side POTS interface while a telephone usually implements a subscriber-side POTS interface. POTS equipment that generates call-state/line-state signaling messages is usually configured to implement either an office-side POTS interface or a subscriber-side POTS interface. In general, the POTS interface defines a multi-point bus transmission line that is connected to one device implementing an office-side POTS interface and a plurality of devices, each implementing a subscriber-side POTS interface.

Call-state/line-state signaling messages are used in a subscriber loop for various frequently-used signaling functions. Generally, the CO switch uses subscriber loop signaling to notify the customer premises about events in the telephone network, while customer premises equipment (CPE) uses subscriber loop signaling to inform the CO to perform actions for the customer. These POTS subscriber loop signaling functions often generate high-frequency interference with broadband channels. For instance, the on-hook/off-hook signal and the pulse-dialing signal are square waveforms which have high-frequency components and theoretically require infinite bandwidth. Also, the off-hook/on-hook signal and the touch-tone dial signal are usually implemented on telephones by spring-loaded, electromechanical switches. Furthermore, the ringing signal is often switched onto the subscriber loop by electromechanical relays. Like most electromechanical devices, these relays do not have perfect response functions, and may not be synchronized to the ringing signal zero crossing. Thus, as opposed to the electromechanical devices reacting in a clean, sharp manner to on and off activations, these devices physically bounce after being activated with an on-off transition and before reaching a final, steady-state condition. As a result, the signal generated on the subscriber loop by these devices has high-frequency components created by the bouncing of the electromechanical relays and the spring-loaded switches. The non zero switching of the ringing signal on to the subscriber loop generates wide band noise. Relay bounce exacerbates the switching and resultant noise problems.

The POTS subscriber loop signaling functions are a source of undesirable noise resulting from transients and harmonics at frequency ranges above the 0 KHz to 4 KHz bandwidth of the standard POTS baseband. The high-frequency components of this noise may interfere with the one or more frequency-division multiplexed broadband channels in frequency ranges above the POTS baseband. Because the legacy, analog POTS subscriber loops are not frequency-division multiplexed with additional channels, the transient noises did not affect communications on these subscriber loops.

Unlike many of the other signals communicated on a subscriber loop, the ring signal and its associated noise transients generated by the telephone switch have a high amplitude that creates a significant problem to broadband channels utilizing the subscriber loop. The ring signal initiated by the telephone switch is a large-amplitude, periodic waveform that is communicated for two second intervals, with each ring separated by four second time periods. This POTS ring signal is specified in FCC Part 68 and generally is an alternating current (AC) signal having a root-mean-squared (rms) voltage of up to about 150 volts. The ring signal was designed to have a large magnitude in order to properly actuate electromechanical ringers that were present in earlier versions of telephones.

Although the large-amplitude ring signal and its associated noise transients are a historical legacy of POTS subscriber loops, on broadband DSLs, these transient ringing signal noises with frequencies above the POTS baseband result in a lower signal-to-noise ratio (SNR) on the broadband channels. By suppressing the transient ringing signal noises, a broadband communications channel will have an improved signal-to-noise ratio which can be used to modify the design parameters of a communications system. Those skilled in the art will be aware that many various design tradeoffs could be made to take advantage of an improved signal-to-noise ratio.

Thus, a heretofore unaddressed need exists in the industry for a way to prevent or substantially minimize the adverse affects of a large-amplitude, high-frequency signal, such as the ring signal, upon the one or more broadband channels that are communicated along the subscriber loop with the analog voice channel.

SUMMARY OF THE INVENTION

The present invention relates generally to the arts of data communications and telephony, and more particularly, to a filter system (and associated methodology) for connection between a source of large-amplitude, high-frequency noise and at least one broadband communications channel which is frequency-division multiplexed into a communications medium. The large-amplitude, high-frequency noise commonly results from a telephone ring signal originated by telephone ring generation equipment (e.g., a CO telephone switch). Generally, the communications medium is a telephone connection transmission line (e.g., a subscriber loop) that can communicate information signals over a baseband channel which usually provides POTS (plain old telephone service) to a subscriber. The filter system is used for suppressing transients and harmonics on the connection caused by large-amplitude, high-frequency signals, such as the telephone ring signal. The suppression advantageously minimizes adverse effects on the one or more broadband channels on the connection.

The present invention comprises a filter system having an amplitude-dependent transfer function that suppresses the interference from at least one signal component, the interference being imposed on at least one communications channel, the at least one signal component being at least part of a signal generated by a noise source, and the at least one signal component being outside of a specified amplitude range.

In another sense, the present invention may be viewed as providing a method for suppressing transients and harmonics on a telephone connection that communicates a baseband, analog POTS channel and one or more broadband channels. These transients and harmonics are generated along with a telephone ring signal and should be minimized to reduce the adverse effects on the one or more broadband channels on the connection.

In this regard, the method can be broadly viewed as comprising the following steps: implementing an amplitude-dependent transfer function; and suppressing the at least one signal component that is outside of a specified amplitude range by using the amplitude-dependent transfer function.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. The reference numbers in the drawings have at least three digits with the two rightmost digits being reference numbers within a figure. The digits to the left of those digits are the number of the figure in which the item identified by the reference number first appears. For example, an item with reference number 209 first appears in FIG. 2.

DETAILED DESCRIPTION OF THE PREFERRED EMBODIMENTS

Figure 1:
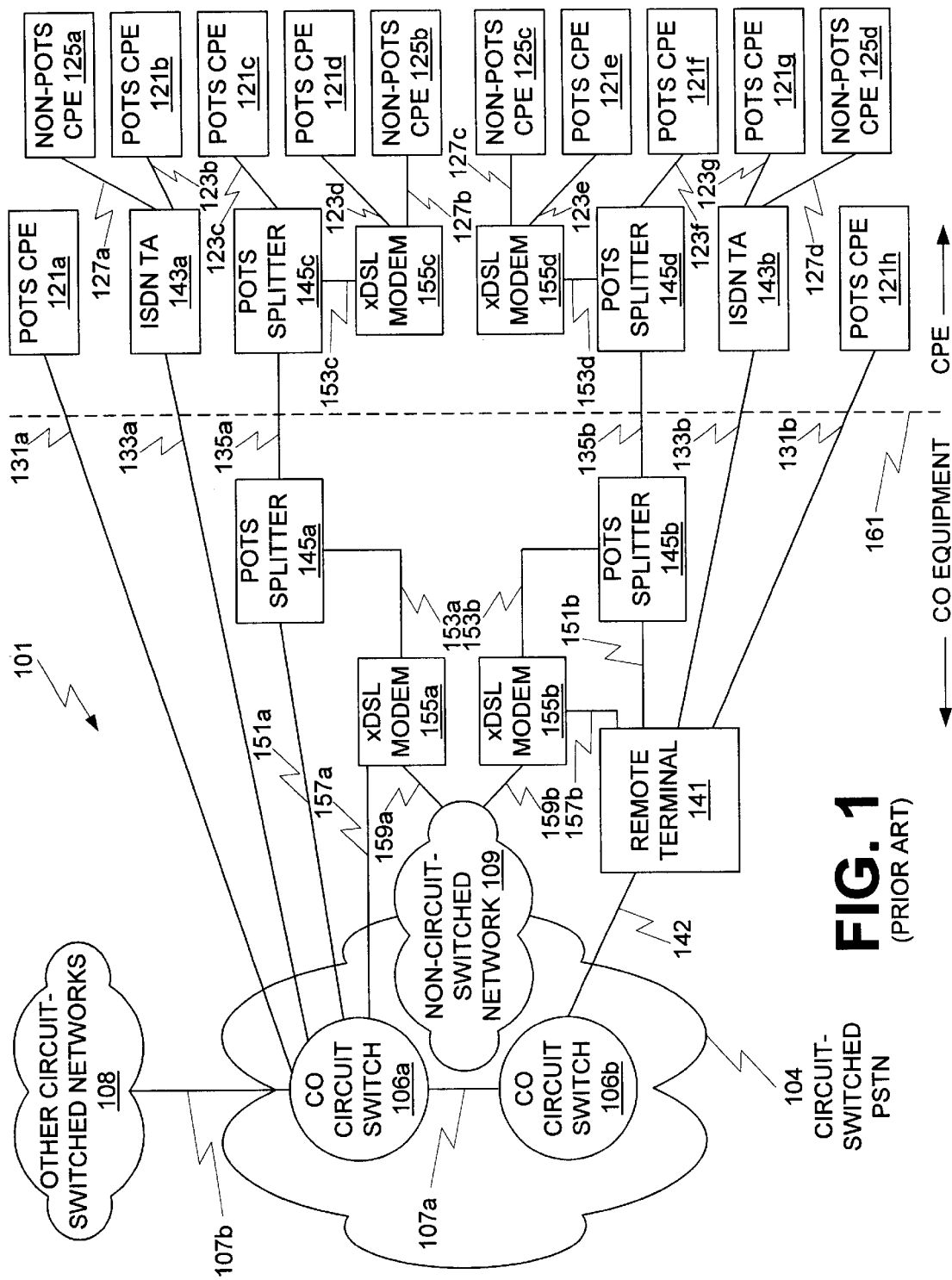
FIG. 1 is a prior art block diagram showing the public telecommunications network connected to a few types of subscriber loops including DSL loops.

One of the unique attributes of the filter system of the present invention is its ability to attenuate a signal based on the large amplitude of components of the signal and the frequency range of components of the signal. The large-amplitude components of the signal, that are in a frequency range used by a communications channel, have to be attenuated to specified attenuation levels in order to minimize the noise that the signal components impose on the communications channel in a communications medium.

The main application of the filter system of the present invention is expected to be filtering large-amplitude, high-frequency signals such as the noise from a POTS ring signal. However, one skilled in the art will be aware that the filtering techniques disclosed in this application easily could be modified to suppress large-amplitude, low-frequency signals. Thus, although the present application refers generally to the filtering of large-amplitude, high-frequency signals and/or signal components, the filtering techniques disclosed in this application are not intended to be limited only to large-amplitude, high-frequency filtering. Instead, the filter system of the present invention has a transfer function that is at least amplitude dependent and may also be frequency dependent. The transfer function is used to reduce interference with a communications channel, the interference coming from noise signals and/or noise signal components which are frequency-division multiplexed into the communications medium containing the communications channel.

Although the specified attenuation levels also might be attained through the use of a frequency-dependent filter, such as a low-pass filter that attenuates a signal based only on its high frequency or a high-pass filter that attenuates a signal based only on its low frequency, this type of solution likely introduces an unacceptable amount of increased impedance and/or reactance into the communications medium. This unacceptable amount of increased impedance and/or reactance adversely affects the performance of the communications medium. Impedance comprises resistance from devices such as resistors and also comprises reactance from devices such as capacitors and inductors. Furthermore, the filter system of the present invention operates without significantly using magnetics to achieve its filtering functionality.

The filter system of the present invention attenuates a signal based on at least the signal's amplitude by filtering the components of the signal that are outside of a specified amplitude range. Moreover, the filter system of the present invention additionally may filter the components of the signal that are also outside of a specified frequency range. Using the filter system of the present invention, which has a transfer function that is amplitude-dependent and that may also be frequency-dependent, the noise signal may be attenuated to specified attenuation levels without increasing the impedance and/or reactance of the communications medium beyond a specified amount of impedance and/or reactance. The specified amplitude range, specified frequency range, specified attenuation levels, and specified amount of impedance and/or reactance depend on at least the characteristics of the communications system, the characteristics of the communications channel, the characteristics of the communications medium, and/or the frequency spectrum of the noise signal.

The filtering techniques disclosed in this application are generally described based on the characteristics of a communications system that frequency-division multiplexes a broadband communications channel and a POTS interface into a communications medium, the POTS interface communicating a ring signal which has transients and harmonics that are large-amplitude, high-frequency signals. However, the filtering techniques disclosed in this application are not intended to be limited only to communications systems with a broadband communications channel frequency-division multiplexed above a POTS interface. The filtering techniques also are applicable to a communications channel that is frequency-division multiplexed with a noise signal which has large-amplitude, low-frequency components.

I. Overview of POTS Equipment

Although the CO switch is the only piece of equipment that generates telephone rings which has so far been mentioned in this specification, those skilled in the art will realize that the filter system of the present invention also could be used with or within any other equipment that generates a noisy POTS ring signal. POTS effectively defines an interface standard that can be implemented by many types of communications equipment. As a result, equipment, such as the filter system of the present invention, built to interface to the POTS standard will work with other equipment that conforms to the POTS standard interface.

Because of the ubiquitous availability of equipment that implements the POTS interface standard, it is not feasible to provide a complete listing of all possible devices that can connect to the filter system of the present invention. However, some illustrative examples may be helpful. For instance, telephone networks often have ring generation circuits inside of equipment such as, but not limited to: switches, multiplexers, channel-banks, and remote terminal subscriber loop concentration devices like that manufactured by and commercially available from Lucent Technologies, Inc., U.S.A. under the trademarked name, SLC®, for Subscriber Loop Carrier system. Thus, the filter system of the present invention could be used with the above types of equipment by externally attaching the filter to some point between the ringing signal generation equipment and the broadband, frequency-division multiplexed channel. Alternatively, the filter system could be used within the equipment that generates the ring which would cause the ring signal output from such equipment to already have the high-frequency noise suppressed. Also, the filter system of the present invention could be incorporated into a POTS splitter.

Much like viewing POTS as an interface standard as opposed to a specific type of subscriber loop and associated equipment, the distinction between CP-based equipment and CO-based equipment also defines an interface. Although the customer premises and the CO are physical locations, the terms are often used as adjectives to describe equipment owned by the customer (CPE) and equipment owned by the service provider (CO equipment) regardless of the actual location of the equipment. Thus, there are no significant technical functionality distinctions between equipment that can be used as CPE and equipment that can be used in a CO. Customers may own the exact same types of equipment used by service providers (e.g., telephone companies), or customers may own equipment with generally the same functionality. The usefulness of the filter system of the present invention does not depend on the arbitrary ownership distinction between CPE and service provider equipment (CO equipment). Thus, customers may use the filter system of the present invention within their own networks.

Figure 2:
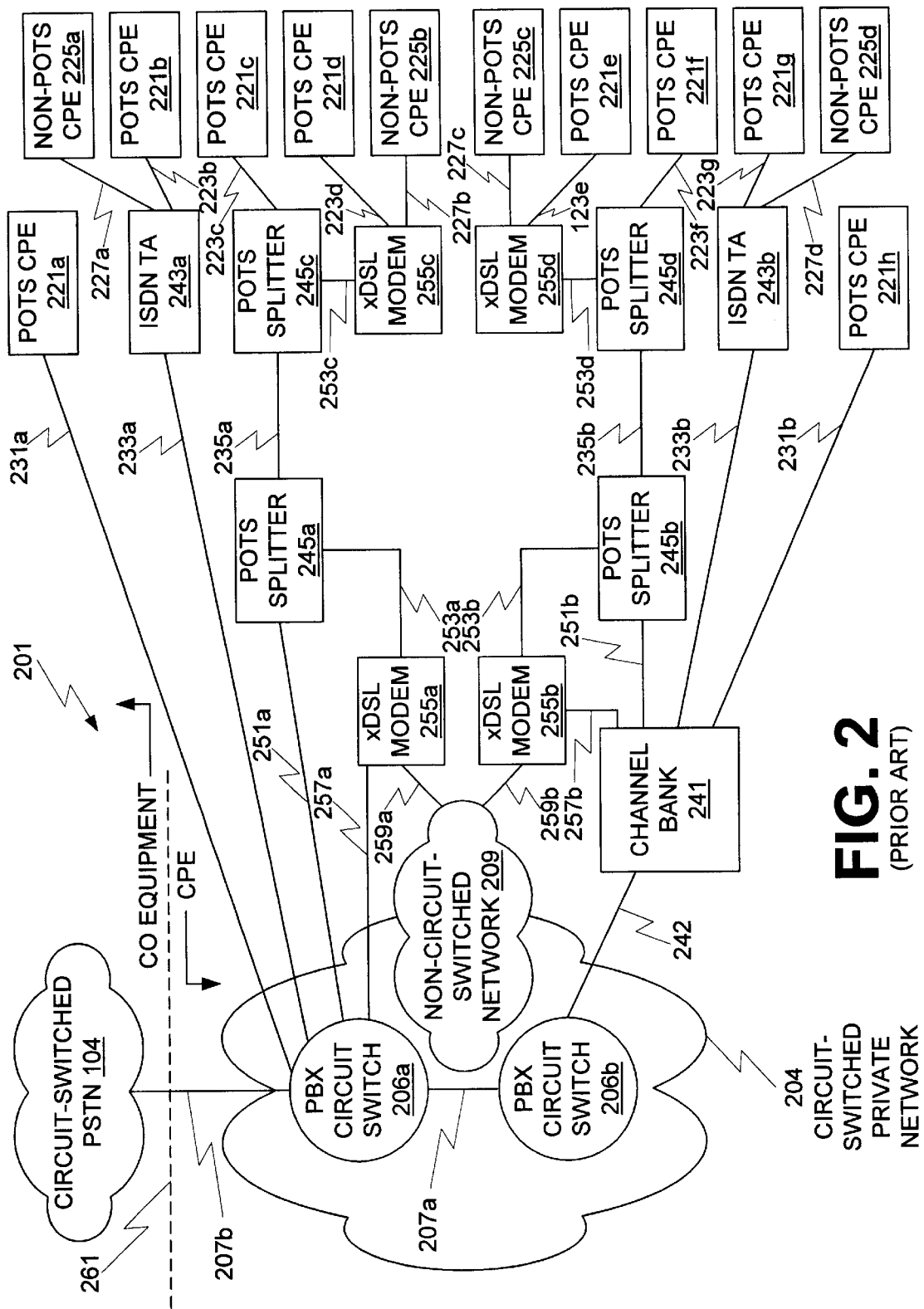
FIG. 2 is a prior art block diagram showing a private telecommunications network connected to the public telecommunications network and showing a few types of subscriber loops including DSL loops with the main difference between FIGS. 1 and 2 being the location of the CO Equipment-CPE boundary line.

Furthermore, the filter system of the present invention can be used within the customer premises to protect broadband channels from ringing signal noise. For instance, equipment that generates ringing signals is often located at the customer premises. The filter system of the present invention can be used with or within this customer premises equipment (CPE) so that at least one broadband channel can be frequency-division multiplexed onto transmission lines attached to CPE that generates ring signals. Ring signal generation CPE, which is functionally similar to CO equipment, includes devices such as, but not limited to: switches (PBXs—Private Branch Exchanges), multiplexers, and channel-banks. In addition, other types of CPE may generate ringing signals. For instance, ISDN TAs, xDSL modems, or other devices which provide POTS functionality at a customer premises generate ringing signals. Any device that provides a POTS interface may generate a noisy ring signal that can be filtered using the filter system of the present invention to improve the signal-to-noise ratio of any broadband channel that is frequency-division multiplexed onto the same communications medium. FIG. 1 and FIG. 2 show a few examples of the many types of common communications network devices that implement POTS interface.

FIG. 1 is prior art that shows the architecture of a communications system 101 comprising the public switched telephone network (PSTN) 104 and its interconnection to some of the possible types of subscriber loops. Because the PSTN 104 was originally designed to carry voice conversations, it is commonly implemented using circuit switches 106a and 106b which are interconnected over trunk lines 107a. Circuit switches are well known in the art, and an example is a model 5ESS® (Electronic Switching System #5) manufactured by and commercially available from Lucent Technologies, Inc., U.S.A. As a result of its historical development, the PSTN 104 is a circuit-switched network that can be interconnected to other circuit-switched networks 108 over trunk lines 107b. Whereas voice connectivity is usually provided over the circuit-switched PSTN 104, data connectivity is often accomplished through a non-circuit-switched network 109 using capabilities such as: non-switched services, packet-switched services, frame-switched services, and cell-switched services to implement dedicated leased lines, X.25, frame relay, and ATM (Asynchronous Transfer Mode) respectively.

Although circuit-switching is the common way to guarantee the throughput and delay performance characteristics of a VF (voice frequency) channel, new technologies have improved the quality of service (QoS) for packetized voice. These advancements have allowed a VF channel to be switched over a non-circuit-switched network 109. In FIG. 1 the POTS CPE blocks 121a–121h represent any equipment that implements the subscriber side of the POTS interface which comprises a VF channel and subscriber-side call-state/line-state signaling. Common types of POTS CPE 121a–121h include devices such as, but not limited to: analog telephones, analog PSTN modems, and answering machines. Cables 123b–123g connect the POTS CPE 121b–121g to devices that implement the office side of the POTS interface which comprises a VF channel and office-side call-state/line-state signaling. Even though the QoS requirements for the VF channels associated with the POTS CPE 121a–121h are usually met by circuit-switched connectivity over the PSTN 104, the VF channels also could be communicated over a non-circuit-switched network 109.

The non-POTS CPE 125a–125d in FIG. 1 are any devices that implement interfaces that are different from the subscriber-side POTS interface. Some common types of these interfaces include, but are not limited to: serial ports such as RS-232 and USB (universal serial bus); LANs (local area networks), such as ethernet and token ring; and WANs (wide area networks) using protocols such as X.25, frame relay, and ATM.

Each piece of non-POTS CPE 125a–125d is connected to at least one communications medium 127a–127d and implements the non-POTS interface over the medium.

The POTS CPE 121a–121h and the non-POTS CPE 125a–125d gain access to the circuit-switched services of the PSTN 104 and the services of the non-circuit-switched network 109 over various types of subscriber loops. FIG. 1 shows three different types of subscriber loops which are the POTS loop 131a and 131b, the ISDN BRI DSL loop 133a and 133b, and the xDSL loop 135a and 135b. The POTS loops 131a and 131b connect the POTS CPE 121a and 121h respectively to devices that implement the office side of the POTS interface which comprises a VF channel and office-side call-state/line-state signaling. In this case the devices that implement the office side of the POTS interface are CO circuit switch 106a for POTS loop 131a and remote terminal 141 for POTS loop 131b. Remote terminal 141 is a subscriber loop concentration device that allows the user traffic and signaling information from various types of subscriber loops to be concentrated on a multiplexed, high-capacity line 142 that commonly is one or more connections to T1s, T3s, or OC-1s.

Each ISDN BRI DSL loop 133a and 133b is connected to an ISDN TA 143a and 143b which can provide voice and data connectivity over two B-channels and one D-channel which are time-division multiplexed on the loop. Each B-channel (bearer channel) operates at digital speed 0 (DS0) which is 64 kbps (kilobits per second). The B-channels are usually connected to circuit switches 106a and 106b to provide connectivity to the circuit-switched PSTN 104. Alternatively, the DS0 B-channels of an ISDN BRI DSL loop 133a and 133b can be connected to non-circuit-switched network 109 though this is not shown in FIG. 1. The ISDN BRI D-channel operates at 16 kbps and provides common channel line-state/call-state signaling as well as packet-switched data connectivity. With the capability to access both circuit-switched services and non-circuit switched services, the ISDN TAs 143a and 143b can provide connectivity for both POTS CPE 121b and 121g as well as non-POTS CPE 125a and 125d.

Each xDSL loop 135a and 135b is connected to a POTS splitter 145a and 145b on the CO side and to a POTS splitter 145c and 145d on the customer premises side. In bi-directional communications systems, one device transmits signals that are received by a second device, and the second device transmits signals that are received by the first device. Bi-directional communications systems can be implemented using a bi-directional communications medium which might consist of a bi-directional transmission line that is used to carry signals in both directions. For bi-directional transmission lines, such as the two-wire subscriber loop, a POTS splitter may be used to perform a splitting function for frequency-division multiplexed signals traveling in one direction and to perform a combining function for frequency-division multiplexed signals traveling in the other direction. Thus, the POTS splitters 145a, 145b, 145c, and 145d are used to combine and split POTS and xDSL signals on the media that is shared by using frequency-division multiplexing on the xDSL loops 135a and 135b.

On signals traveling from the CO to the customer premises, the CO-side POTS splitters 145a and 145b combine POTS signals from the PSTN 104 on cables 151a and 151b with xDSL signals on media 153a and 153b. On signals traveling from the customer premises to the CO, the customer-premises-side POTS splitters 145c and 145d combine POTS signals from POTS CPE 121c and 121f on cables 123c and 123f with xDSL signals on media 153c and 153d. For signals traveling in the opposite directions, the POTS splitters 145a, 145b, 145c, and 145d operate as signal splitters instead of signal combiners. To the CO-circuit switches 106a and 106b as well as remote terminal 141, media 151a and 151b implement a standard POTS interface. Thus, the CO-circuit switches 106a and 106b and the remote terminal 141 consider cables 151a and 151b to be standard POTS loops.

Before the xDSL signals and the POTS signals can be combined onto the xDSL loops 135a and 135b by the technique of frequency-division multiplexing, the xDSL modems 155a, 155b, 155c, and 155d modulate (frequency shift) the signal that is output on media 153a, 153b, 153c, and 153d respectively. The xDSL modems 155a, 155b, 155c, and 155d together with the POTS splitters 145a, 145b, 145c, and 145d perform the modulation/demodulation and combining/splitting functions that are necessary for frequency-division multiplexing. Furthermore, the xDSL modems 155a, 155b, 155c, and 155d and the POTS splitters 145a, 145b, 145c, and 145d might perform some noise filtering, but not all of the noise filtering required for optimal performance on the broadband DSL is performed in the prior art equipment.

Like the ISDN TAs, the xDSL modems 155a, 155b, 155c, and 155d are capable of using additional multiplexing techniques to provide access to services from the circuit-switched PSTN 104 and to services from the non-circuit-switched network 109. These services could be time-division multiplexed and/or frequency-division multiplexed into the xDSL channels that are already frequency-division multiplexed above the POTS baseband.

FIG. 1 shows the CO-side xDSL modems 155a and 155b connected to the circuited switched PSTN 104 over cables 157a and 157b. These connections could be used to provide circuit-switched connectivity to the POTS CPE 121d and 121e and/or the non-POTS CPE 125b and 125c connected to xDSL modems 155c and 155d. Cables 157a and 157b might be POTS connections to CO circuit switch 106a and remote terminal 141. However, cables 157a and 157b are more likely to provide DS0 connectivity together with some signaling channel. The xDSL modems 155a and 155b also are connected to the non-circuit-switched network 109 over cables 159a and 159b. These connections could be used to provide non-circuit-switched connectivity to the POTS CPE 121d and 121e and/or the non-POTS CPE 125b and 125c connected to xDSL modems 155c and 155d.

The xDSL modem connection to various network services allows flexible support of different customer applications. For example, the circuit-switched connectivity might provide data and voice functionality over the xDSL loops 135a and 135b. Also, the non-circuit-switched connectivity might provide data and voice functionality over the xDSL loops 135a and 135b. Non-circuit-switched voice connectivity utilizing packet, frame, or cell switching would have to handle the QoS issues for voice functionality. The xDSL modems 155a and 155b may be connected to the various capabilities of the circuit-switched PSTN 104 and the non-circuit-switched network 109 without requiring connection to all of the circuit-switched and non-circuit-switched services.

In addition, to gain production economies and simplify cabling requirements, the CO-side xDSL modems are often built in concentration devices called DSLAMs (digital subscriber line access multiplexers). DSLAMs usually combine one or more xDSL modems and connect them to the circuit-switched services and the non-circuit-switched services using high capacity lines. The DSLAM equipment also may incorporate other network functions such as the POTS splitter function. Finally, line 161 shows the arbitrary dividing line between CO equipment and CPE. The CO-equipment to CPE line 161 only arbitrarily separates who legally owns the equipment or who is legally responsible for maintaining the equipment. The CO-equipment to CPE line 161 does not determine any of the technical functionality of the equipment.

FIG. 2 is similar to FIG. 1 with the main difference being the location of the CO-equipment to CPE line 261. In addition, some of the names of the equipment have changed from FIG. 1 to FIG. 2 to reflect the more common names for the equipment when it is used in a customer network. For instance, as shown in FIG. 2, circuit switches in private networks 206a and 206b are usually known as PBXs (private branch exchanges). Also, multiplexers for circuit-switched devices are sometimes called channel banks 241 in a circuit-switched private network 204. The actual devices used to implement FIG. 2 may be exactly the same as the devices used to implement FIG. 1. The description of FIG. 2 is generally the same as the description of FIG. 1 with 2XX numbers substituted in FIG. 2 for the 1XX numbers in FIG. 1, where X stands for any digit from 0 to 9. The CO-equipment to CPE line 261 only arbitrarily separates who legally owns the equipment or who is legally responsible for maintaining the equipment. Thus, the CO-equipment to CPE line 261 does not determine any of the technical functionality of the equipment.

II. Basic Filter System Functionality

Figure 3:
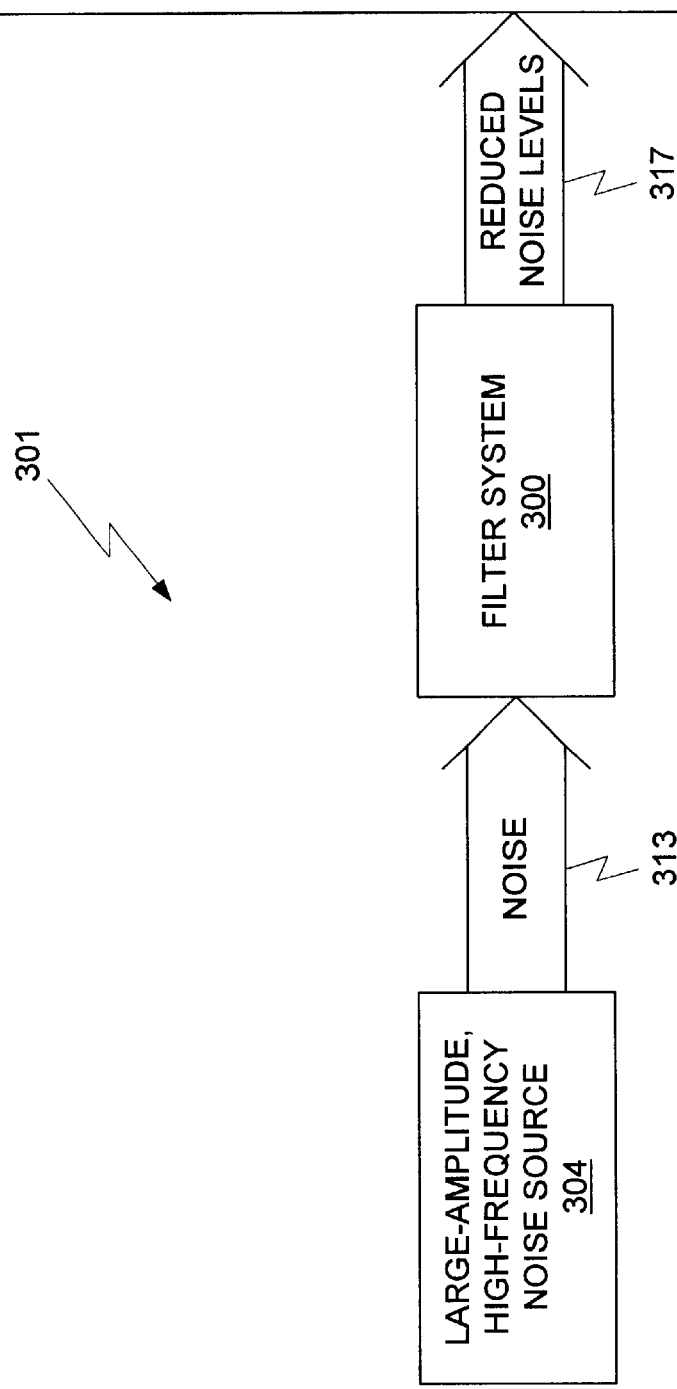
FIG. 3 is a functional block diagram showing the general behavior of the filter system of the present invention in a communications system.

FIG. 3 shows the filter system 300 of the present invention. Filter system 300 is connected in communications system 301 where a large-amplitude, high-frequency noise source 304 is filtered prior to the noise entering communications medium 312 which contains at least one channel in the frequency range of the noise. The noise 313 is input to filter system 300, and a signal with reduced noise levels 317 is output from filter system 300. Thus, filter system 300 is designed to create reduced noise levels 317 from the large-amplitude, high-frequency noise source 304 before the noise 313 interferes with the at least one channel in the frequency range of the noise, the channel being contained in communications medium 312. The filter system 300 should be connected in communications system 301 somewhere between large-amplitude, high-frequency noise source 304 and communications medium 312 which contains at least one channel in the frequency range of the noise. The filter system 300 can be connected at any point in communications system 301 so long as a signal with noise 313 is input into filter system 300 prior to the connection to communications medium 312, which contains at least one channel in the frequency range of the noise, so that filter system 300 can create a signal with reduced noise levels 317.

III. Applications for the Filter System

Although the filter system of the present invention is designed to address market requirements for frequency-division multiplexing DSL channels over a POTS channel on subscriber loops, the filter system of the present invention can be used in any communications system to selectively suppress large-amplitude, high frequency signals which interfere with frequency-division multiplexed channels.

To fulfill its application, the filter system can be used at any connection point where it is necessary to filter ringing signal noise. Usually, the best place to connect a filter, which is designed to eliminate noise, is immediately next to the source of the noise. The goal of the filter system is to suppress large-amplitude, high-frequency noise, such as the noise from a POTS ring signal, before the noise reaches a medium containing at least one frequency-division multiplexed, broadband communications channel. This goal can be accomplished when the filter is connected directly between the noise source and the communications channel. In addition, the filter system will still work if there are intervening elements between the noise source and the filter and/or between the filter and the communications channel.

The placement of the filter system between the ringing signal generation equipment and the subscriber loop suppresses the ringing signal noise on broadband communications channels in the subscriber loop and broadband communications channels within the customer premises. For both channels in the subscriber loop and channels within the customer premises, the filter is between the noise source (i.e., the ring generation equipment) and the communications channels. As opposed to filtering ring signal noise before it reaches the subscriber loop, the filter system of the present invention could also be placed within a customer premises to filter ring signal noise before it reaches the customer premises wiring. The customer premises wiring is a transmission line within the customer premises that can be used to carry broadband channels which are frequency-division multiplexed onto the transmission line. Although a filter placed within the customer premises will not suppress CO generated noise from interfering with communications channels on the subscriber loop, it will allow the internal customer wiring to carry the additional frequency-division multiplexed, broadband channels. This use of the filter system within a customer premises provides benefits for broadband channels on the customer premise wiring that are similar to the benefits from the use of the filter for broadband channels on a subscriber loop. Thus, the filter system would reduce the noise level for broadband channels on the customer wiring which would improve the signal-to-noise ratio of the channels.

In general, the filter system of the present invention can be used to provide a low-capacitance filter for large-amplitude, high-frequency signals, such as that generated from the transient noise of a POTS ring signal. The filter system of the present invention can be connected at any point in the communications system between the source of the noise signal and a broadband communications channel. It will work to suppress interference from the noise signal with the broadband communications channel. As a result, the signal-to-noise ratio of the broadband channel will be improved and the specifications of the communications system can be modified or revised to advantageously utilize the improved signal-to-noise ratio.

Figure 4:
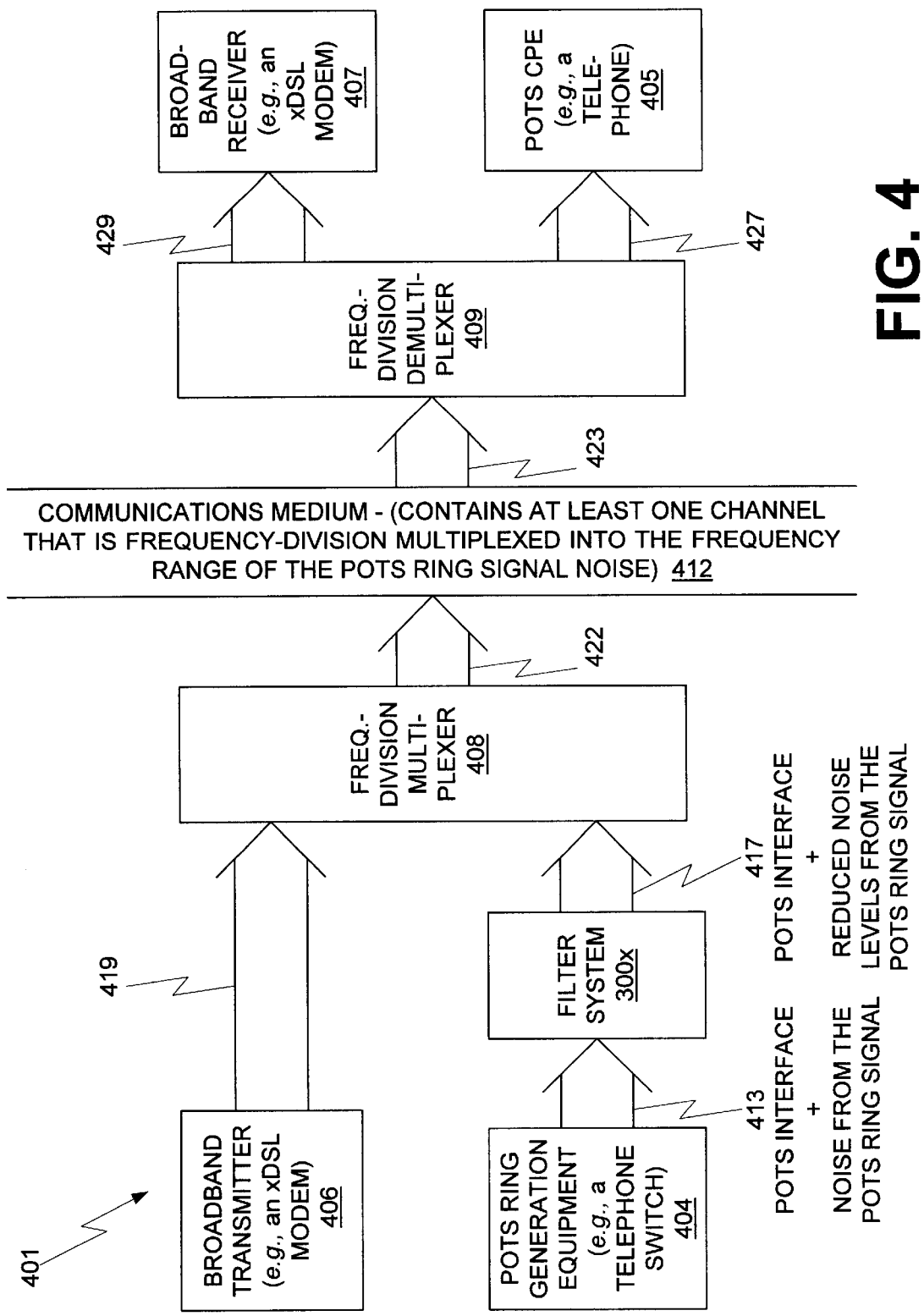
FIG. 4 is a block diagram showing how the general behavior of the filter system of the present invention (as shown in FIG. 3) is used in a communications system with POTS ring generation equipment and a broadband signal that is frequency-division multiplexed into the same communications medium with a POTS interface comprising a POTS VF channel and POTS call-state/line state signaling.
Figure 5:
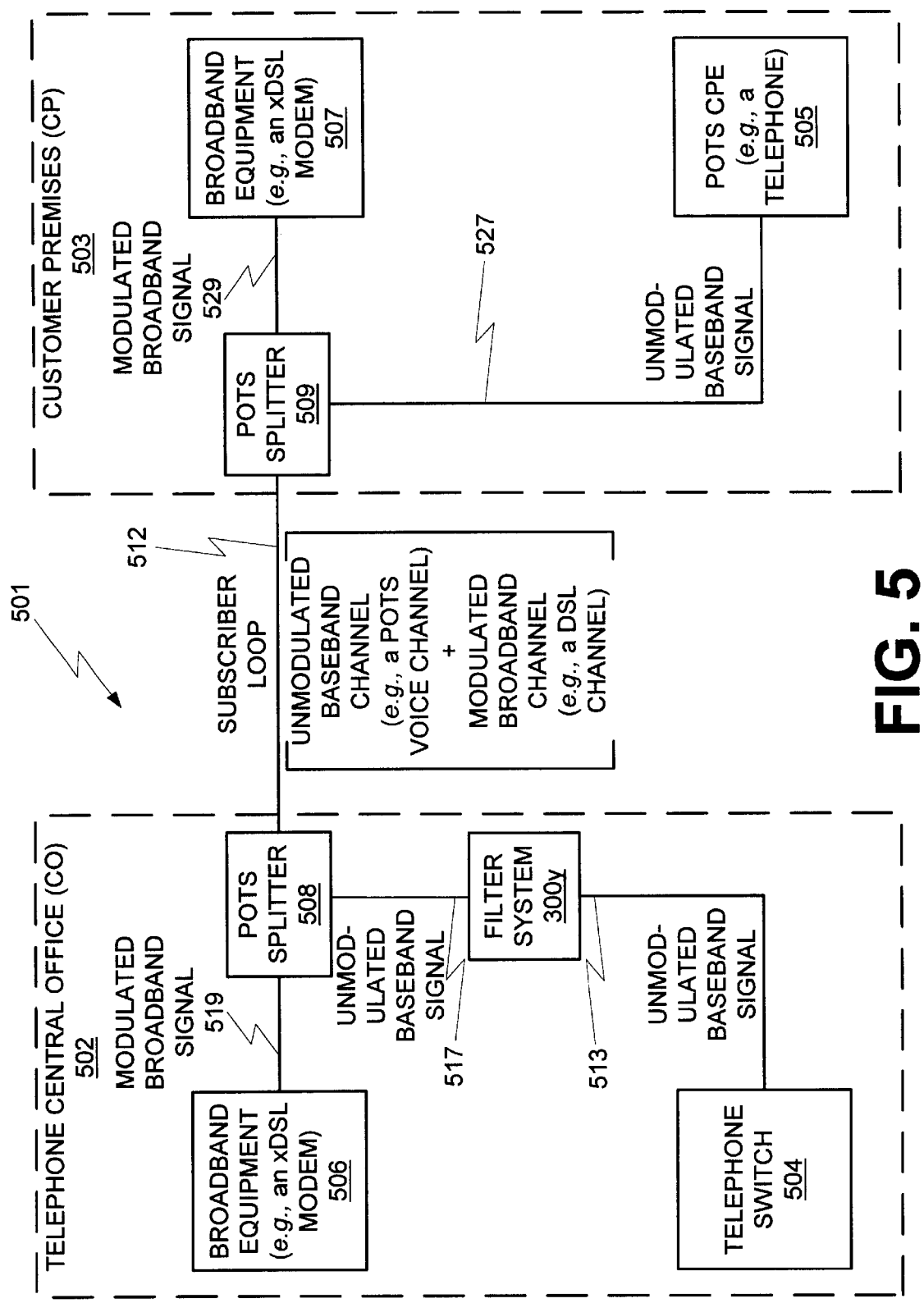
FIG. 5 is a block diagram of one communications system arrangement showing the filter system of the present invention connected at a CO between a CO telephone switch and a subscriber loop.
Figure 6:
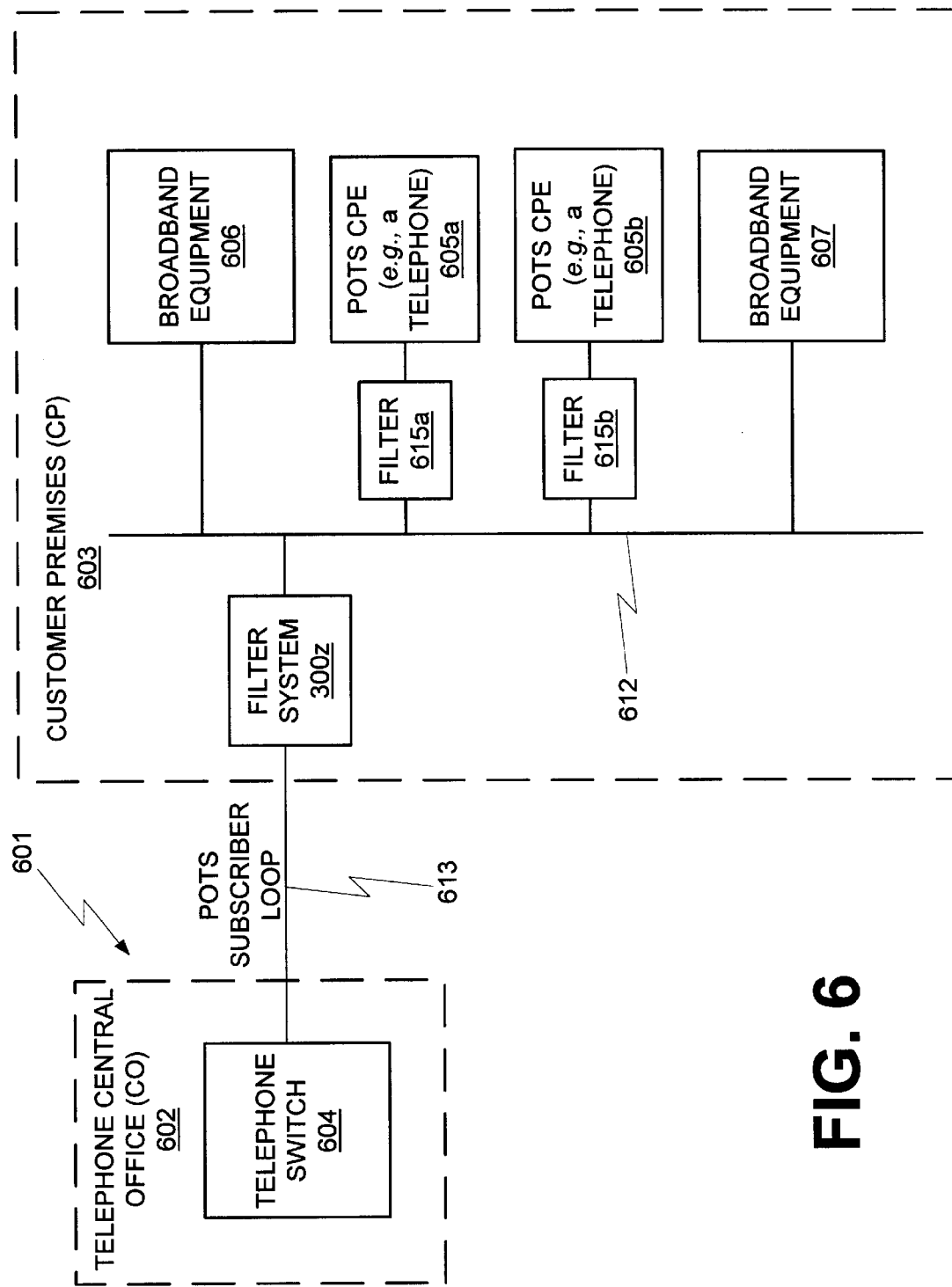
FIG. 6 is a block diagram of one communications system arrangement showing the filter system of the present invention connected between a subscriber loop with a noisy POTS ring signal and the customer premises internal wiring which is used to carry at least one frequency-division multiplexed channel within the customer premises.

The filter system of the present invention uniquely uses the criteria of amplitude and frequency to selectively attenuate large-amplitude, high-frequency noise signals. Although FIGS. 4, 5, and 6 show applications of filter system 300, these applications are only meant to be examples of uses for filter system 300. The applications for filter system 300 are not intended to be limited only to those applications shown in the figures. The filter system of the present invention filter system can be used in any communications system where it is useful to suppress large-amplitude, high-frequency interference with a frequency-division multiplexed channel. Any such applications are intended to be included herein within the scope of the present invention. The application of filter system 300 is shown in general in FIG. 4 as filter system 300x. In addition, FIGS. 5 and 6 show filter system 300 in applications as filter system 300y and 300z, respectively. FIG. 5 shows filter system 300y in an application for suppressing large-amplitude, high-frequency ring signal noise on a local loop to allow at least one broadband DSL channel to be frequency-division multiplexed onto the local loop. FIG. 6 shows filter system 300z in an application for suppressing large-amplitude, high-frequency ring signal noise within a customer premises to allow at least one broadband DSL channel to be frequency-division multiplexed onto the customer premises wiring. FIGS. 4, 5, and 6 will each be described in more detail in the following paragraphs.

FIG. 4 shows one use of the filter system 300x of the present invention in communications system 401. The POTS ring generation equipment 404 is one type of large-amplitude, high-frequency noise source 304. The POTS ring generation equipment 404 communicates with POTS CPE 405 through communications system 401 using a POTS interface, which comprises a 4 KHz baseband VF channel and the necessary call-state/line state signaling messages. In addition, broadband transmitter 406 communicates a broadband channel through communications system 401 to broadband receiver 407. A frequency-division multiplexer 408 and a frequency-division demultiplexer 409 are used in communications system 401 in order for the baseband VF channel and the broadband channel to share communications medium 412.

The output of the POTS ring generation equipment 404 is a POTS interface and noise from the POTS ring signal 413, which is inputted into filter system 300x. The output of filter system 300x is a POTS interface with reduced noise levels from the POTS ring signal 417. This POTS interface with the reduced noise levels from the POTS ring signal 417 is combined with broadband signal 419 in frequency-division multiplexer 408. The frequency division multiplexer 408 outputs frequency-division multiplexed signals 422 which are placed on communications medium 412. Communications medium 412 contains at least one channel that is frequency-division multiplexed into the frequency range of the POTS ring signal noise. In addition, communications medium 412 is used to deliver frequency-division multiplexed signals 423 to frequency-division demultiplexer 409 to be split into POTS interface 427 and broadband channel 429 which are used by POTS CPE 405 and broadband receiver 407, respectively.

FIG. 4 shows only a uni-directional communications system 401 in which POTS signals only flow from POTS ring generation equipment 404 to POTS CPE 405 and broadband signals only flow from broadband transmitter 406 to broadband receiver 407. In a unidirectional communications system, frequency-division multiplexer 408 may comprise a modulation function and a combining function while frequency-division demultiplexer 409 may comprise a demodulation function and a splitting function. For a bi-directional communications system that uses a bi-directional communications medium, devices that implement the functions of both frequency-division multiplexer 408 and frequency-division demultiplexer 409 may be combined into one bi-directional, frequency-division multiplexing and demultiplexing device on each side of communications medium 412. Such multiplexing and demultiplexing devices may comprise functions such as signal modulation, signal demodulation, signal combining, and signal splitting. The modulation and demodulation functions are not necessary in the frequency-division multiplexers if signal transmitters and receivers such as POTS ring generation equipment 404, POTS CPE 405, broadband transmitter 406, and broadband receiver 407 implement the frequency shifting functions. In addition, the splitting and combining functions of a frequency-division multiplexer may be nothing more than connecting filter system 300x, POTS CPE 405, broadband transmitter 406, and broadband receiver 407 directly to communications medium 412. Thus, the functions of frequency-division multiplexer 408 and frequency-division demultiplexer 409 may not be actual components in communications system 401. Instead, the signal modulation and signal demodulation functions may be accomplished inside of other components of communications system 401, and the splitting and combining functions may be no more than connecting the equipment to transmission lines.

FIG. 5 shows one use of the filter system 300y of the present invention in communications system 501, where filter system 300y is connected between telephone switch 504 and POTs splitter 508. Telephone switch 504 generates POTS ring signals and is one type of large-amplitude, high-frequency noise source 304. Telephone switch 504 communicates with POTS CPE 505 through communications system 501 using a POTS interface, which comprises a 4 KHz baseband VF channel and the necessary call-state/line state signaling messages. In addition, broadband equipment 506 communicates with broadband equipment 507 over a broadband channel in communications system 501. The broadband channel is communicated through POTS splitters 508 and 509 over the communications medium of subscriber loop 512.

Telephone switch 504 communicates with POTS CPE 505 using unmodulated baseband signal 513 which comprises a 4 KHz baseband VF channel and the necessary call-state/ line state signaling messages including noise from the telephone ring signal. This unmodulated baseband signal 513 is filtered by filter system 300y to create unmodulated baseband signal 517 which comprises a 4 KHz baseband VF channel and the necessary call-state/line state signaling messages with reduced noise levels for the telephone ring signal.

POTS splitters 508 and 509 each perform both a splitting function and a combining function because the communications medium of subscriber loop 512 is a bi-directional communications medium. The application of a splitting function or a combining function in POTS splitters 508 and 509 depends on the direction of signal transmission in the bi-directional communications medium of subscriber loop 512. POTS splitter 508 combines unmodulated baseband signal 517 with modulated broadband signal 519 for transmission over subscriber loop 512. In addition, POTS splitter 508 splits signals received on subscriber loop 512 into unmodulated baseband signal 517 and modulated broadband signal 519. POTS splitter 509 splits signals received on subscriber loop 512 into unmodulated baseband signal 527 and modulated broadband signal 529. Also, POTS splitter 509 combines unmodulated baseband signal 527 with modulated broadband signal 529 for transmission over subscriber loop 512.

Because broadband equipment 506 and 507 implement the modulation and demodulation functions and because POTS splitters 508 and 509 implement the combining and splitting functions, no additional devices are used for frequency-division multiplexing the broadband channel with the 4 KHz baseband VF channel and the necessary call-state/line state signaling messages. As a result, the functions shown in FIG. 4 for frequency-division multiplexer 408 and frequency-division demultiplexer 409 are divided up and implemented in broadband equipment 506 and 507 as well as in POTS splitters 508 and 509.

Filter system 300y in FIG. 5 is used to suppress large-amplitude, high-frequency noise that occurs during the telephone ring signal generation of telephone switch 504. By suppressing the large-amplitude, high-frequency noise, the signal-to-noise ratio can be improved for a broadband channel that is frequency-division multiplexed onto the same communications medium with a 4 KHz baseband VF channel and the necessary call-state/line state signaling messages of a POTS interface.

Although the design of filter system 300 was driven by the market demands for digital subscriber line (DSL) technology, the use of filter system 300 of the present invention is not restricted to this basic application that is depicted in FIG. 5. FIG. 6 suggests an additional application for filter system 300 of the present invention. In FIG. 6 filter system 300z is used to suppress large-amplitude, high-frequency noise that interferes with a broadband channel which is frequency-division multiplexed on the internal customer wiring. The placement of filter system 300y in FIG. 5 between telephone switch 504 and POTS splitter 508 reduces the interference from ring signal noise with frequency-division multiplexed broadband channels in subscriber loop 512 and in the wiring within a customer premise (CP) 503. Thus, placing filter system 300 closer to the noise source reduces the interference from the noise with broadband channels on any communications medium connected after filter system 300 has filtered the noise source. These applications for filter system 300 are not intended to be limiting and are only examples of how filter system 300 could be used.

FIG. 6 shows one use of the filter system 300z of the present invention in communications system 601, where filter system 300z is connected between telephone central office (CO) 602 and the customer premises wiring 612. Telephone switch 604 generates POTS ring signals and is one type of large-amplitude, high-frequency noise source 304. Telephone switch 604 communicates with POTS CPE 605a and 605b through communications system 601 using a POTS interface, which comprises a 4 KHz baseband VF channel and the necessary call-state/line state signaling messages. The POTS interface defines a multi-point bus with one office-side device (telephone switch 604) connected to a plurality of subscriber-side devices (POTS CPE 605a and 605b). In addition, broadband equipment 606 communicates with broadband equipment 607 over a broadband channel in customer premises wiring 612.

In FIG. 6, customer premises wiring 612 is the frequency-division multiplexed communications medium. POTS subscriber loop 613 is used to carry a 4 KHz baseband VF channel and the necessary call-state/line state signaling messages between the telephone switch 604 and POTS CPE 605a and 605b. Filter system 300z is used to suppress the large-amplitude, high-frequency noise generated by the telephone ring signal of telephone switch 604. This reduces the telephone ring signal interference with one or more broadband channels which are frequency-division multiplexed onto the customer premises wiring 612. Depending on the type of POTS CPE 605a and 605b used in communications system 601, additional POTS filters 615a and 615b may be used to further isolate the 4 KHz baseband VF channel and the necessary call-state/line state signaling messages of the POTS CPE 605a and 605b from the broadband channel used by broadband equipment 606 and 607. Furthermore, the frequency-division multiplexing functions of modulating, demodulating, combining, and splitting are not shown in FIG. 6 because these functions could be incorporated into broadband equipment 606 and 607.

The main application for filter system 300 is expected to be in a communications system which has a broadband channel that is frequency-division multiplexed onto a subscriber line as depicted in the FIG. 5 application for filter system 300y. Thus, FIGS. 7–16 will use reference number connections that relate to FIG. 5. This reference number decision is only for convenience and is not intended to limit the possible applications of he filter system 300 of the present invention.

IV. Implementing the Filter System

In architecture, the filter system comprises functions designed to selectively suppress large-amplitude, high-frequency noise signals. As generally known in the art, filter systems can be implemented using circuit elements, signal processing devices, or combinations of the two. Thus, although the filter system of the present invention is described in embodiments using filters built from discrete circuit elements other implementations are possible. These other implementations include, but are not limited to, the use of digital signal processors (DSPs) which can be used to realize many types of filter system designs. One of the unique things about the filter system of the present invention is that it uses the criteria of amplitude and frequency to selectively attenuate large-amplitude, high-frequency noise signals on a communications medium.

Figure 7:
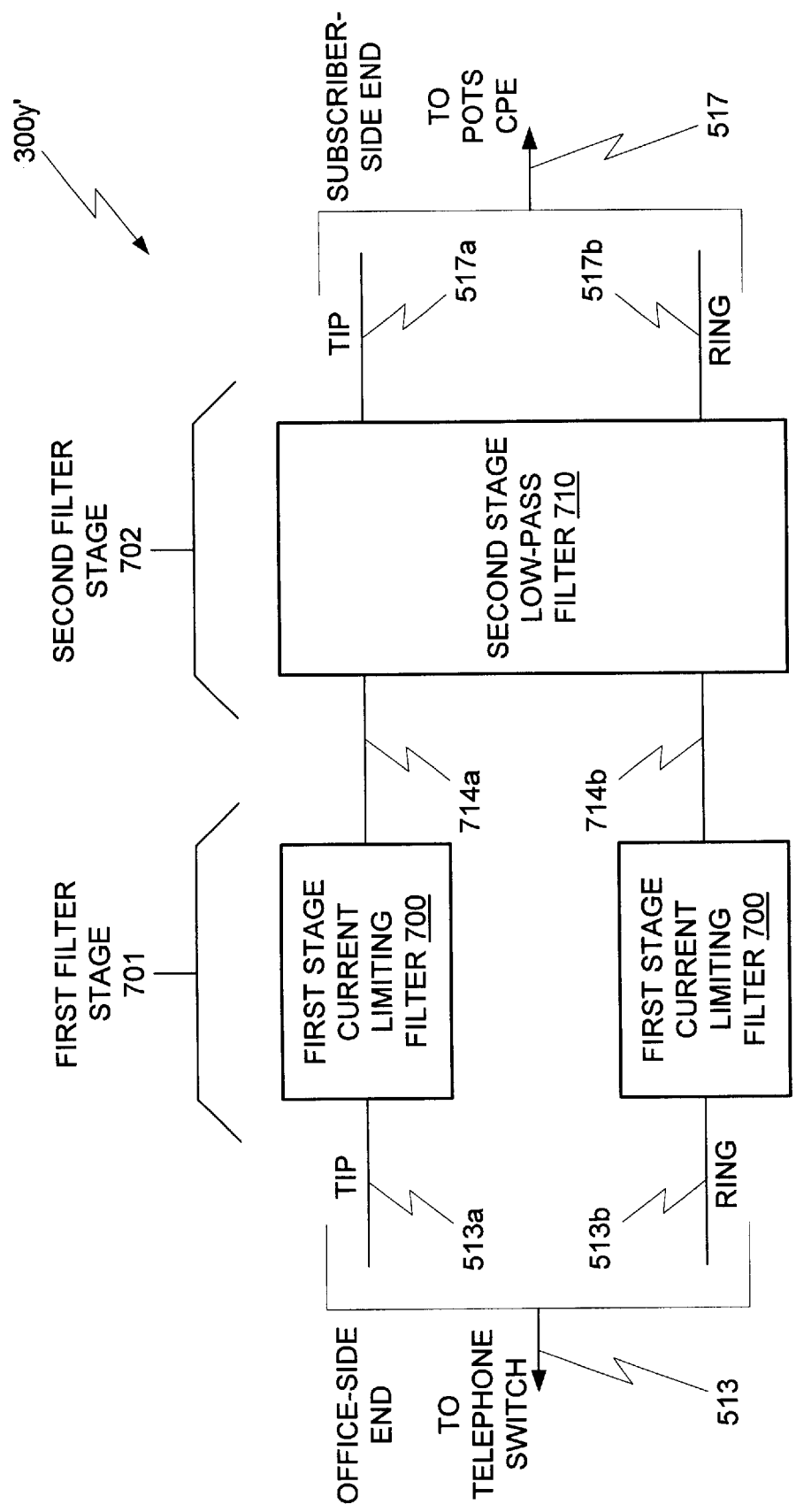
FIG. 7 is a functional diagram of a two-stage, first embodiment of the filter system of FIGS. 3, 4, 5 and 6.
Figure 8:
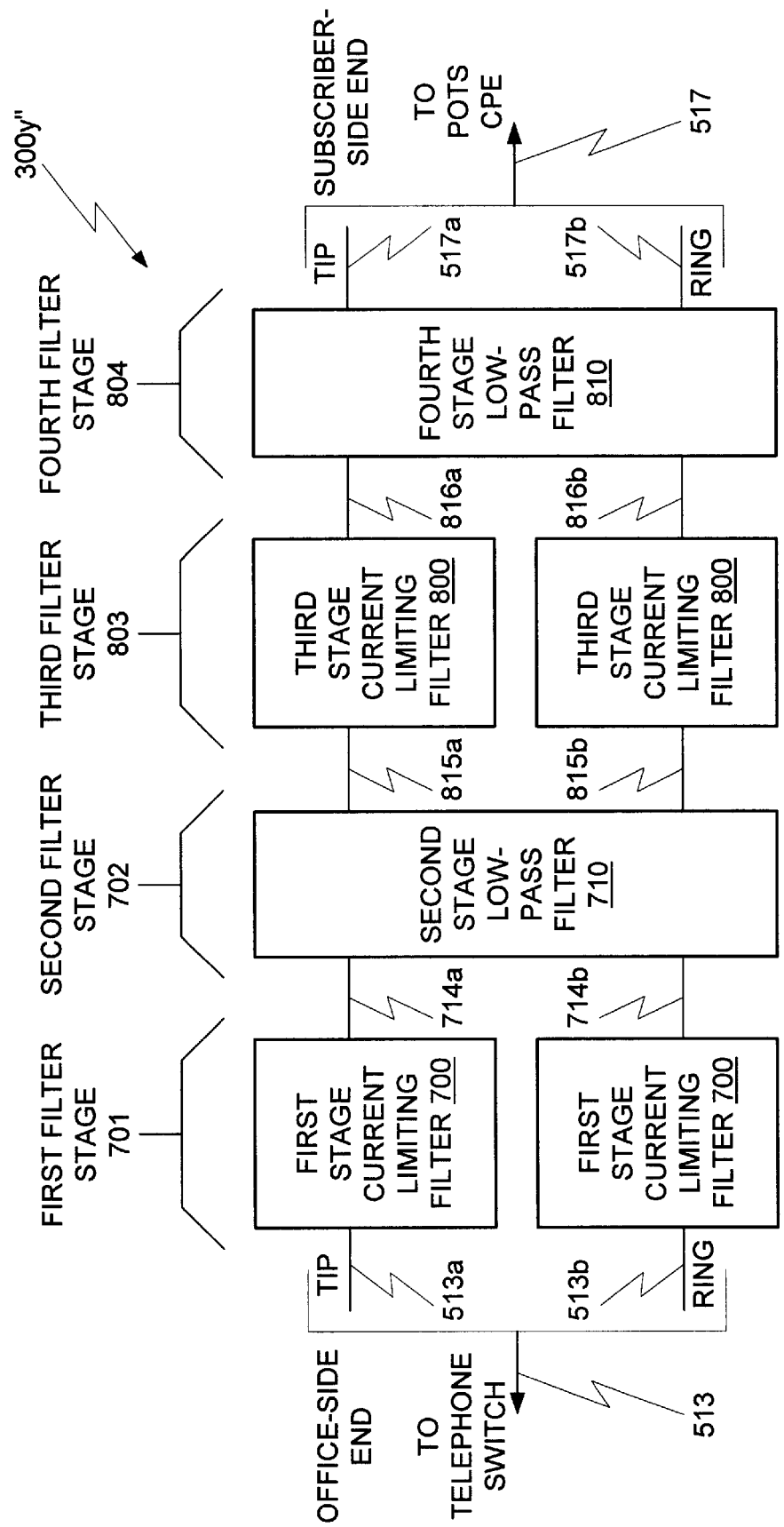
FIG. 8 is a functional diagram of a four-stage, second embodiment of the filter system of FIGS. 3, 4, 5, and 6.

In the circuit element versions of the filter system of the present invention, the filter system comprises one or more filter stages with each stage designed to implement either a current-limiting filter function, which selectively suppresses a signal component based on its large amplitude, or a low-pass filter function, which selectively suppresses a signal component based on its high frequency. The filter system is designed to attenuate frequencies higher than a ring signal so that transients and harmonics produced from the ring signal are suppressed. In addition, the current-limiting filter function may be designed to exhibit frequency-dependent behavior to further improve the filter's ability to suppress transient and harmonic ringing signal noise. FIGS. 7 and 8 show block diagrams of two-stage and four stage implementations of the filter system of the present invention.

FIG. 7 is a block diagram showing two-stage filter system 300y', which is one implementation of the filter system 300 of the present invention. Two-stage filter system 300y' is mainly expected to be used as filter system 300y in the subscriber line frequency-division multiplexing application of FIG. 5. As shown in FIG. 7, two-stage filter system 300y' has two ends, an office-side end on the left and a subscriber-side end on the right. Each end has two terminals so that filter system 300y' has a total of four terminals. The office-side end of two-stage filter system 300y' usually is attached to a POTS interface that connects to telephone ring generation equipment such as a central office telephone switch. The subscriber-side end of two-stage filter system 300y' usually is attached to a POTS interface that connects to POTS CPE on a subscriber loop. A POTS interface comprises a tip wire and a ring wire where the historical names for the wires come from the description of contacts on the plugs used by switchboard operators to manually switch telephone calls.

In FIG. 7, the office-side end of two-stage filter system 300y' comprises a first terminal and a second terminal which together form connection point 513. Connection point 513 comprises tip wire 513a, which is the first terminal of two-stage filter system 300y', and ring wire 513b, which is the second terminal of two-stage filter system 300y'. Also, the subscriber-side end of two-stage filter system 300y' comprises a third terminal and a fourth terminal which together form connection point 517. Connection point 517 comprises tip wire 517a, which is the third terminal of two-stage filter system 300y', and ring wire 517b, which is the fourth terminal of two-stage filter system 300y'.

Two-stage filter system 300y' is connected in series with a transmission line that implements a POTS interface (a.k.a. a POTS transmission line). Thus, two-stage filter system 300y' is connected at the beginning or end of a POTS transmission line or it is inserted into the middle of a POTS transmission line. Two-stage filter system 300y' does not perform a useful function if it is connected in parallel with a POTS transmission line.

The two-wire POTS interface is bi-directional meaning that it carries both signals from a telephone switch to the POTS CPE and signals from the POTS CPE to a telephone switch. Because of the bidirectional nature of the POTS interface, each end of the two-stage filter system 300y' functions as both an input and an output with the behavior determined by the direction of the signal. Two-stage filter system 300y' is designed to work on a bi-directional POTS interface so that signals traveling from the office-side end to the subscriber-side end are filtered in a generally similar manner to signals traveling from the subscriber-side end to the office-side end. Because two-stage filter system 300y' functions bi-directionally, the filter would perform in a generally similar manner even if it were inserted in the communications system in a reversed direction such that: the first terminal and the second terminal at the office-side end of two-stage filter system 300y' are attached to connection point 517, and the third terminal and the fourth terminal at the subscriber-side end of two-stage filter system 300y' are attached to connection point 513.

Furthermore, the tip and ring wires of a standard analog POTS loop are not polarity sensitive. Thus, two-stage filter system 300y' will work properly even if the tip and ring wires are reversed at the office-side end and/or the subscriber-side end. For example, two-stage filter system 300y' will work properly if tip wire 513a is the second terminal of two-stage filter system 300y' and ring wire 513b is the first terminal of two-stage filter system 300y'. Also, two-stage filter system 300y' will work properly if tip wire 517a is the fourth terminal of two-stage filter system 300y' and ring wire 517b is the third terminal of two-stage filter system 300y'.

Two-stage filter system 300y' comprises a pair of first stage current limiting filters 700 that form first filter stage 701. In addition, the second filter stage 702 of two-stage filter system 300y' comprises second stage low-pass filter 710. The first stage current limiting filters 700 are two terminal devices that each connect in series on one wire of a two-wire POTS interface. In contrast, the second stage low-pass filter 710 is a four terminal device which is connected in series with both wires of a two-wire POTS interface. The first stage current limiting filters 700 implement a filtering function that attenuates large-amplitude signals while the second stage low-pass filter 710 implements a filtering function that attenuates high-frequency signals. The filtering function of the first stage current limiting filters 700 also may be frequency dependent so that high-frequency signals are attenuated in first filter stage 701. Together, first filter stage 701 and second filter stage 702 work to suppress large-amplitude, high-frequency signals, such as the noise from a POTS ring signal.

FIG. 7 shows one first stage current limiting filter 700 connected in series on the tip wire of a POTS interface between intermediate node 714a and tip wire 513a which is the first terminal of two-stage filter system 300y'. In addition, FIG. 7 shows the other first stage current limiting filter 700 connected in series on the ring wire of a POTS interface between intermediate node 714b and ring wire 513b which is the second terminal of two-stage filter system 300y'. Second stage low-pass filter 710 has its first terminal connected to intermediate node 714a and its second terminal connected to intermediate node 714b. The third terminal of second stage low-pass filter 710 is the third terminal of two-stage filter system 300y' which is tip wire 517a in FIG. 7. The fourth terminal of second stage low-pass filter 710 is the fourth terminal of two-stage filter system 300y' which is ring wire 517b in FIG. 7.

Because two-stage filter system 300y' is designed with generally the same transfer function in both directions and because the two wires of a POTS interface are not polarity sensitive, those skilled in the are will be aware that several variations of two-stage filter system 300y' are possible. One variation might be to connect one first stage current limiting filter 700 between the first terminal of second stage low-pass filter 710 and tip wire 513a on the office-side end of two-stage filter system 300y'. The other first stage current limiting filter 700 would then be connected between the fourth terminal of second stage low-pass filter 710 and ring wire 517b on the subscriber-side end of two-stage filter system 300y'. The second terminal of second stage low-pass filter 710 would be the same as ring wire 513b on the office-side end of two-stage filter system 300y'. Finally, the third terminal of second stage low-pass filter 710 would be the same as tip wire 517*a* on the subscriber-side end of two-stage filter system 300*y*'. All these variations of two-stage filter system 300*y*' are intended to be within the scope of this application.

FIG. 8 is a block diagram showing four-stage filter system 300*y*", which is one implementation of the filter system 300 of the present invention. Four-stage filter system 300*y*" is mainly expected to be used as filter system 300*y* in the subscriber line frequency-division multiplexing application of FIG. 5. As shown in FIG. 8, four-stage filter system 300*y*" has two ends, an office-side end on the left and a subscriber-side end on the right. Each end has two terminals so that filter system 300*y*" has a total of four terminals. The office-side end of four-stage filter system 300*y*" usually is attached to a POTS interface that connects to telephone ring generation equipment such as a central office telephone switch. The subscriber-side end of four-stage filter system 300*y*" usually is attached to a POTS interface that connects to POTS CPE on a subscriber loop.

In FIG. 8, the office-side end of four-stage filter system 300*y*" comprises a first terminal and a second terminal which together form connection point 513. Connection point 513 comprises tip wire 513*a*, which is the first terminal of four-stage filter system 300*y*", and ring wire 513*b*, which is the second terminal of four-stage filter system 300*y*". Also, the subscriber-side end of four-stage filter system 300*y*" comprises a third terminal and a fourth terminal which together form connection point 517. Connection point 517 comprises tip wire 517*a*, which is the third terminal of four-stage filter system 300*y*", and ring wire 517*b*, which is the fourth terminal of four-stage filter system 300*y*".

Four-stage filter system 300*y*" is connected in series with a transmission line that implements a POTS interface (a.k.a. a POTS transmission line). Thus, four-stage filter system 300*y*" is connected at the beginning or end of a POTS transmission line or it is inserted into the middle of a POTS transmission line. Four-stage filter system 300*y*" does not perform a useful function if it is connected in parallel with a POTS transmission line.

The two-wire POTS interface is bi-directional meaning that it carries both signals from a telephone switch to the POTS CPE and signals from the POTS CPE to a telephone switch. Because of the bi-directional nature of the POTS interface, each end of the four-stage filter system 300*y*" functions as both an input and an output with the behavior determined by the direction of the signal. Four-stage filter system 300*y*" is designed to work on a bi-directional POTS interface so that signals traveling from the office-side end to the subscriber-side end are filtered in a generally similar manner to signals traveling from the subscriber-side end to the office-side end. Because four-stage filter system 300*y*" functions bi-directionally, the filter would perform in a generally similar manner even if it were inserted in the communications system in a reversed direction such that: the first terminal and the second terminal at the office-side end of four-stage filter system 300*y*" are attached to connection point 517, and the third terminal and the fourth terminal at the subscriber-side end of four-stage filter system 300*y*" are attached to connection point 513.

Furthermore, the tip and ring wires of a standard analog POTS loop are not polarity sensitive. Thus, four-stage filter system 300*y*" will work properly even if the tip and ring wires are reversed at the office-side end and/or the subscriber-side end. For example, four-stage filter system 300*y*" will work properly if tip wire 513*a* is the second terminal of four-stage filter system 300*y*" and ring wire 513*b* is the first terminal of four-stage filter system 300*y*". Also, four-stage filter system 300*y*" will work properly if tip wire 517*a* is the fourth terminal of four-stage filter system 300*y*" and ring wire 517*b* is the third terminal of four-stage filter system 300*y*".

Four-stage filter system 300*y*" is built from simpler filter components which perform various functions in each of the four stages of four-stage filter system 300*y*". First, four-stage filter system 300*y*" comprises a pair of first stage current limiting filters 700 that form first filter stage 701. Second, the second filter stage 702 of four-stage filter system 300*y*" comprises second stage low-pass filter 710. Next, four-stage filter system 300*y*" comprises a pair of third stage current limiting filters 800 that form third filter stage 803. Finally, the fourth filter stage 804 of four-stage filter system 300*y*" comprises fourth stage low-pass filter 810.

The first stage current limiting filters 700 are two terminal devices that each connect in series on one wire of a two-wire POTS interface. In contrast, the second stage low-pass filter 710 is a four terminal device which is connected in series with both wires of a two-wire POTS interface. In addition, the third stage current limiting filters 800 are two terminal devices that each connect in series on one wire of a two-wire POTS interface. Also, the fourth stage low-pass filter 810 is a four terminal device which is connected in series with both wires of a two-wire POTS interface.

The first stage current limiting filters 700 implement a filtering function that attenuates large-amplitude signals while the second stage low-pass filter 710 implements a filtering function that attenuates high-frequency signals. The filtering function of the first stage current limiting filters 700 also may be frequency dependent so that high-frequency signals are attenuated in first filter stage 701. The third stage current limiting filters 800 implement a filtering function that attenuates large-amplitude signals. The fourth stage low-pass filter 810 implements a filtering function that attenuates high-frequency signals. The filtering function of the third stage current limiting filters 800 also may be frequency dependent so that high-frequency signals are attenuated in third filter stage 803. Furthermore, first stage current limiting filters 700 may implement generally the same transfer function as third stage current limiting filters 800, but first stage current limiting filters 700 and third stage current limiting filters 800 do not have to implement generally the same transfer function. In addition, second stage low-pass filter 710 may implement generally the same transfer function as fourth stage low-pass filter 810, but second stage low-pass filter 710 and fourth stage low-pass filter 810 do not have to implement generally the same transfer function. Together, first filter stage 701, second filter stage 702, third filter stage 803, and fourth filter stage 804 work to suppress large-amplitude, high-frequency signals, such as the noise from a POTS ring signal.

FIG. 8 shows one first stage current limiting filter 700 connected in series on the tip wire of a POTS interface between intermediate node 714*a* and tip wire 513*a* which is the first terminal of four-stage filter system 300*y*". In addition, FIG. 8 shows the other first stage current limiting filter 700 connected in series on the ring wire of a POTS interface between intermediate node 714*b* and ring wire 513*b* which is the second terminal of four-stage filter system 300*y*". Second stage low-pass filter 710 has its first terminal connected to intermediate node 714*a* and its second terminal connected to intermediate node 714*b*. The third terminal of second stage low-pass filter 710 is connected to intermediate node 815*a*, and the fourth terminal of second stage low-pass filter 710 is connected to intermediate node 815*b*.

In FIG. 8, one third stage current limiting filter 800 is connected in series on the tip wire of a POTS interface between intermediate node 815a and intermediate node 816a. Also, FIG. 8 shows the other third stage current limiting filter 800 connected in series on the ring wire of a POTS interface between intermediate node 815b and intermediate node 816b. Fourth stage low-pass filter 810 has its first terminal connected to intermediate node 816a and its second terminal connected to intermediate node 816b. The third terminal of fourth stage low-pass filter 810 is the third terminal of four-stage filter system 300y" which is tip wire 517a in FIG. 8. The fourth terminal of fourth stage low-pass filter 810 is the fourth terminal of four-stage filter system 300y" which is ring wire 517b in FIG. 8.

Because four-stage filter system 300y" is designed with generally the same transfer function in both directions and because the two wires of a POTS interface are not polarity sensitive, those skilled in the are will be aware that several variations of four-stage filter system 300y" are possible. Some of these variations include, but are not limited to, permutations on the order of connecting filter stages 701, 702, 803 and 804, and multiplicities of filters in cascade. All these variations of four-stage filter system 300y" are intended to be within the scope of this application.

V. Current Limiting Filter Embodiments

Figure 9:
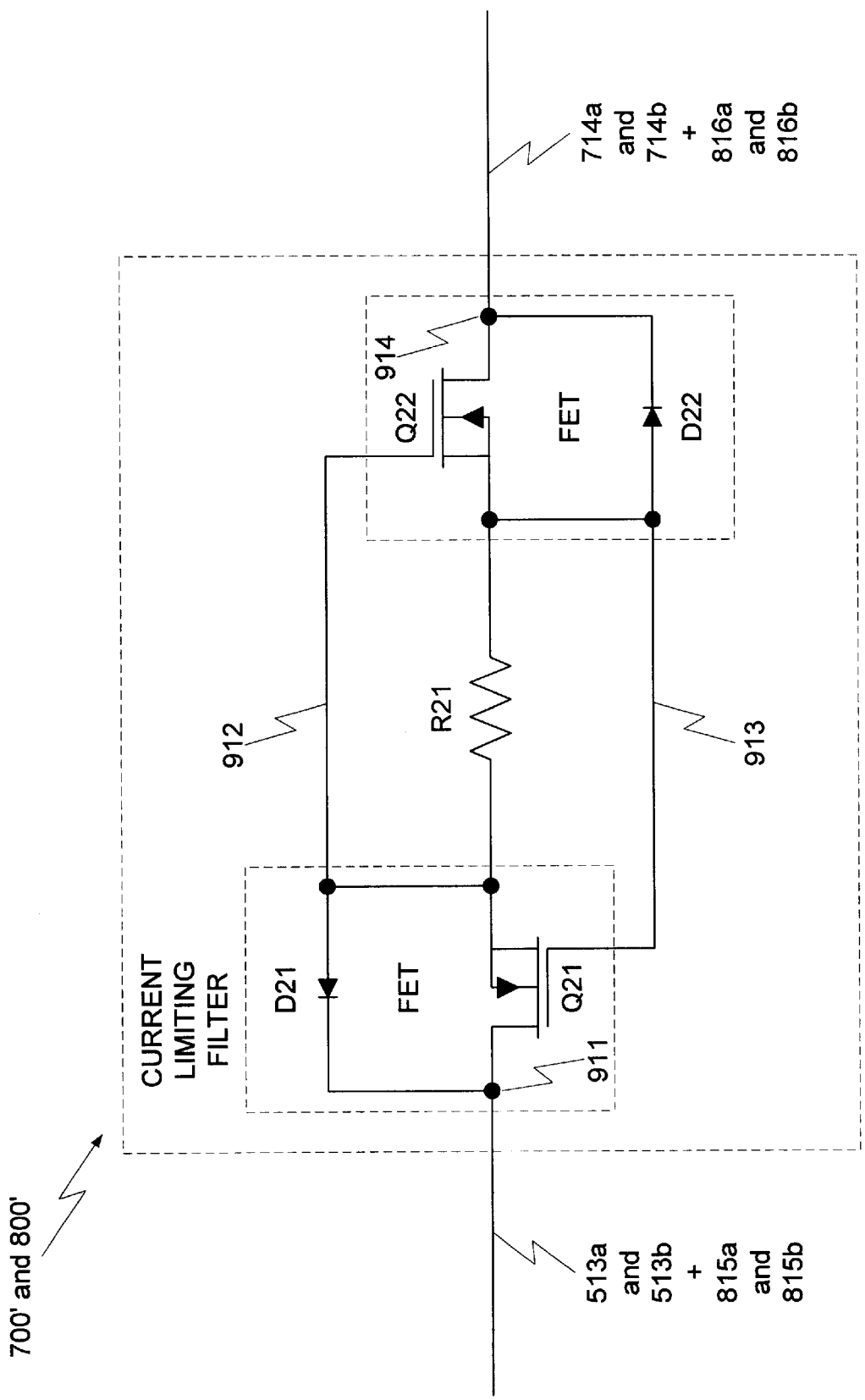
FIG. 9 is a first embodiment of a current-limiting filter from FIGS. 7 and 8.
Figure 10:
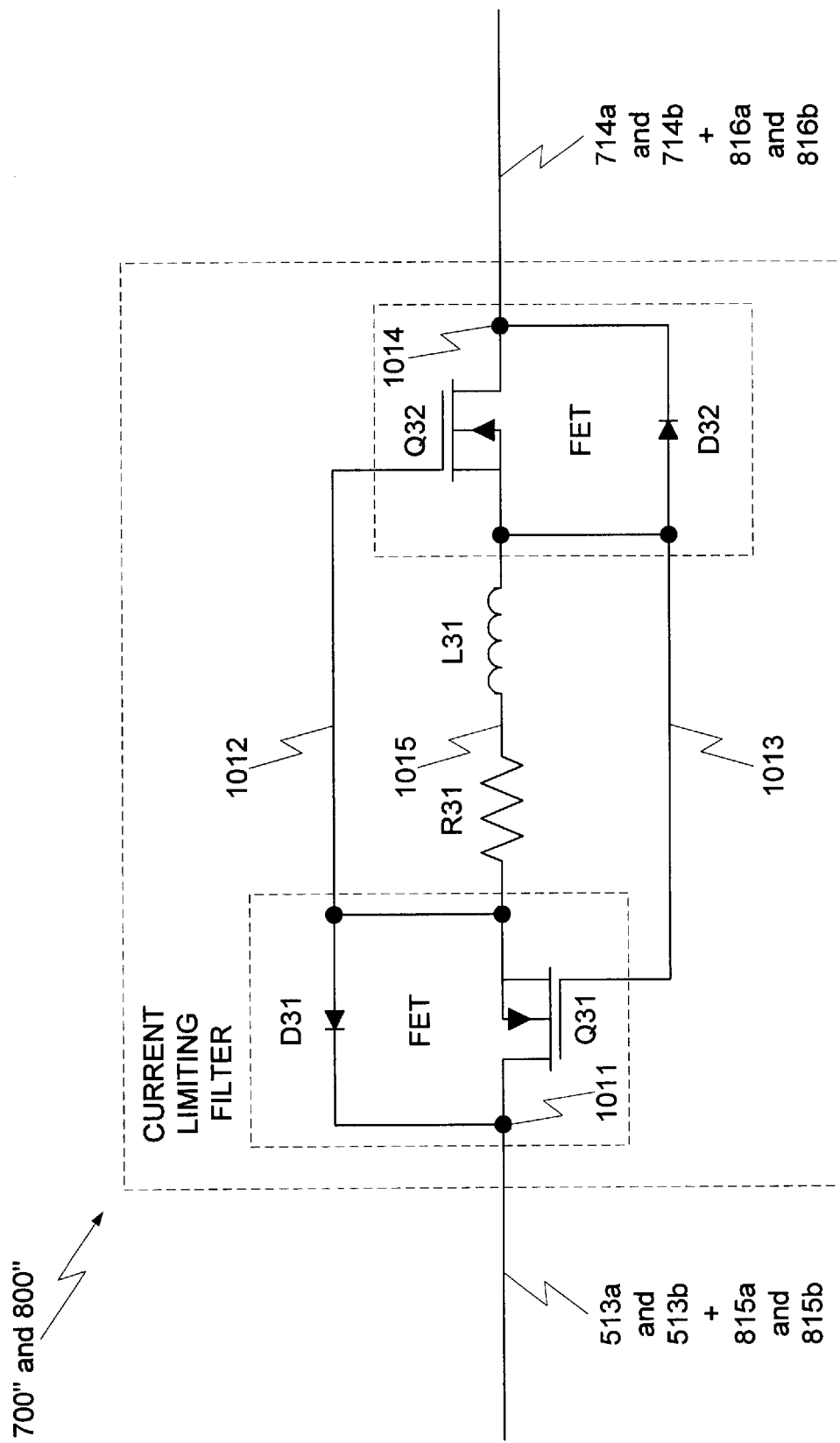
FIG. 10 is a second embodiment of a current-limiting filter from FIGS. 7 and 8.
Figure 11:
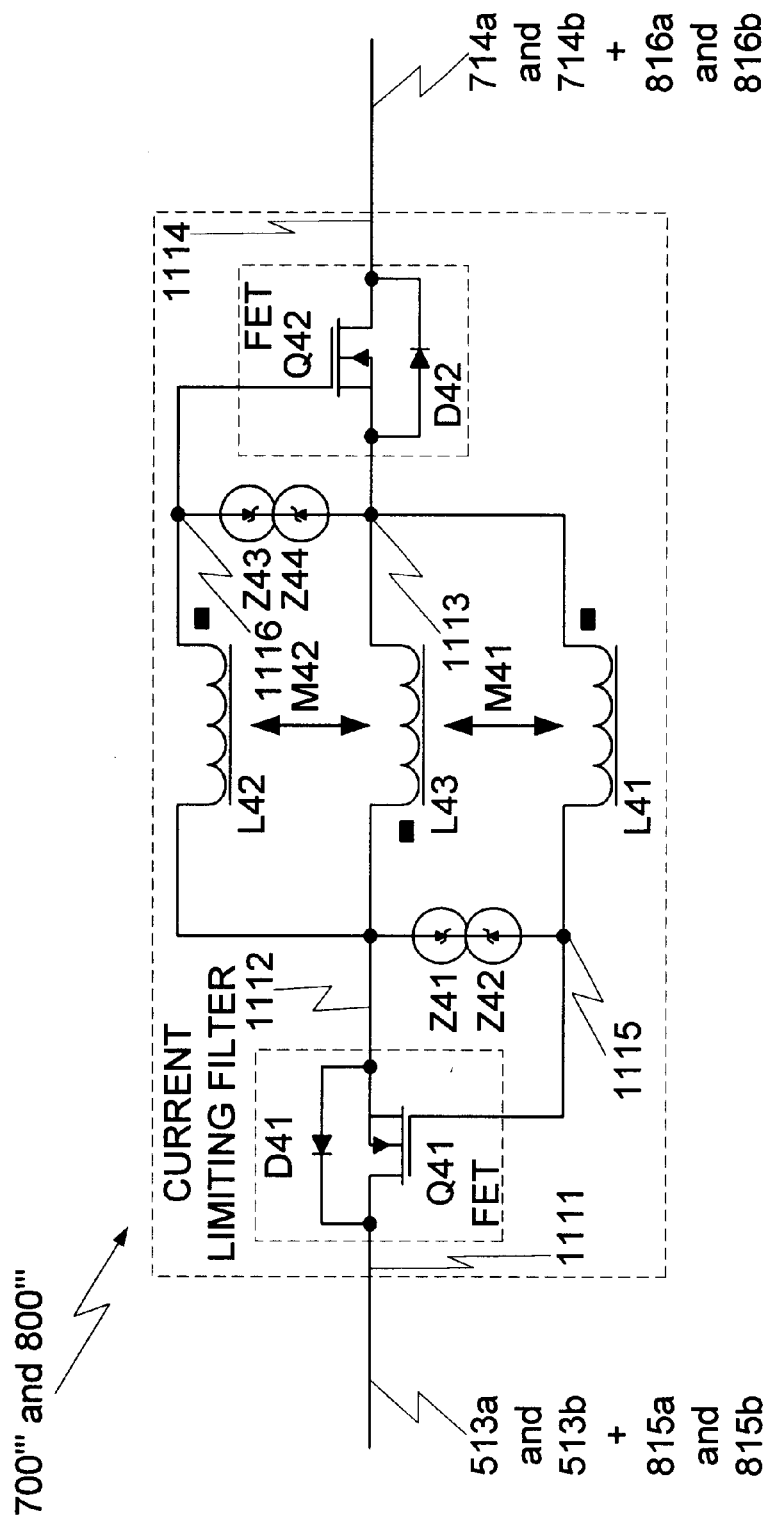
FIG. 11 is a third embodiment of a current-limiting filter from FIGS. 7 and 8.

FIGS. 9–11 show four different embodiments of current limiting filters that can be used for first stage current limiting filter 700 and/or third stage current limiting filter 800. The four embodiments of current limiting filters shown in FIGS. 9–11 are bi-directional current limiting filters because signals traveling in one direction through the current limiting filters are filtered in generally similar manners to signals traveling in the other direction through the current limiting filters. Thus, the transfer functions of the current limiting filters are generally similar in both directions of signal flow. The bi-directional current limiting filters may be separately patentable, and the applicants reserve the right to file additional patent office documentation which is based on the present application and which covers these filters.

Furthermore, the bi-directional current limiting filters of FIGS. 9–11 can be made to have generally the same transfer function in each direction of current flow by selecting certain components within a current limiting filter to have generally the same parameters as other corresponding components within that same current limiting filter. A bi-directional current limiting filter with generally the same transfer function in each direction of current flow is referred to in this application as a symmetrically bi-directional current limiting filter. When used in filters systems on a bi-directional communications medium, such as a two-wire POTS loop, the current limiting filters are usually bi-directional current limiting filters that are configured to behave symmetrically. FIGS. 9–11 will now be described in detail.

A. First Embodiment of a Current Limiting Filter

Before describing the complete functionality of the current limiting filters 700' and 800' in FIG. 9, some symbol conventions should be mentioned. First, the value of a voltage rise from initial point B to final point A is computed as $V_A - V_B$ and is labeled as $V_{AB}$ so that the voltage rise from source (S) to gate (G) is $V_{GS}$. In addition, $V_{GS}$ of Q22 (FIG. 9) can also be represented using node numbers 913 and 912 as $V_{912-913}$. Furthermore, current flows in this application are defined in the normal way for electrical engineers as the direction of flow for positive holes against the flow of negatively charged electrons. Finally, this document interchangeably uses "node" and "wire" to refer to electrically similar elements with a node and/or a wire being a location which has generally the same voltage potential throughout the node and/or wire.

The first embodiment of current limiting filter 700 from FIG. 7 is shown as current limiting filter 700' in FIG. 9. Also, this same filter circuit is a first embodiment of current limiting filter 800 from FIG. 8 and is denoted as current limiting filter 800' in FIG. 9. References in this document that apply to current limiting filter 700' and to current limiting filter 800' are specified as: current limiting filters 700' and 800'. Current limiting filter 700' may be used twice in the first filter stage 701 of two-stage filter system 300y' as shown in FIG. 7. In addition, current limiting filter 700' may be used twice in the first filter stage 701 of four-stage filter system 300y" as shown in FIG. 8. In one use of current limiting filter 700' as shown in FIG. 9, the filter's first port is connected to tip wire 513a while the filter's second port is connected to intermediate node 714a. In another use of current limiting filter 700' as shown in FIG. 9, the filter's first port is connected to ring wire 513b while the filter's second port is connected to intermediate node 714b.

Current limiting filter 800' may be used twice in the third filter stage 803 of four-stage filter system 300y" as shown in FIG. 8. In one use of current limiting filter 800' as shown in FIG. 9, the filter's first port is connected to intermediate node 815a while the filter's second port is connected to intermediate node 816a. In another use of current limiting filter 800' as shown in FIG. 9, the filter's first port is connected to intermediate node 815b while the filter's second port is connected to intermediate node 816b.

Current limiting filters 700' and 800' comprise diode D21, diode D22, resistor R21, MOSFET Q21, and MOSFET Q22. Diode D21 has its cathode connected to node 911 and its anode connected to node 912. Diode D22 has its anode connected to node 913 and its cathode connected to node 914. Resistor R21 is connected between node 912 and node 913. MOSFET Q21 is an n-type, depletion mode MOSFET with its substrate or body terminal connected to its source terminal. MOSFET Q21 has its gate terminal (G1) connected to node 913, its source terminal (S1) connected to node 912, and its drain terminal (D1) connected to node 911. MOSFET Q22 is an n-type, depletion mode MOSFET with its substrate or body terminal connected to its source terminal. MOSFET Q22 has its gate terminal (G2) connected to node 912, its source terminal (S2) connected to node 913, and its drain terminal (D2) connected to node 914. Also, node 911 is the first port of current limiting filters 700' and 800' while node 914 is the second port of current limiting filters 700' and 800'.

As a depletion mode MOSFET, the channel of MOSFET Q21 is normally conducting so that current $i_{D1}$ flows from the drain terminal (node 911) to the source terminal (node 912) when the voltage rise from source terminal to drain terminal, $V_{D1S1}$ (or $V_{911-912}$), is positive and as long as the voltage rise from the source terminal to the gate terminal, $V_{G1S1}$ (or $V_{913-912}$), remains above a cutoff threshold voltage, $V_{cutoff}$, which is around −3V. Once $V_{G1S1}$ (or $V_{913-912}$) reaches $V_{cutoff}$, the channel of MOSFET Q21 is restricted and current flow $i_{D1}$ is limited. R21 functions as a current to voltage conversion network. When current flow $i_{D1}$ increases through node 912 into R21, $V_{G1S1}$ (or $V_{913-912}$) decreases according to the basic relation $V_{G1S1} = -V_{S1G1} = -i_{D1} \times R21$. Thus, increases in current $i_{D1}$ bring about decreases in voltage $V_{G1S1}$ (or $V_{913-912}$) which eventually cause MOSFET Q21 to limit the current in the channel.

Similarly, as a depletion mode MOSFET, the channel of MOSFET Q22 is normally conducting so that current $i_{D2}$ flows from the drain terminal (node 914) to the source terminal (node 913) when the voltage rise from source terminal to drain terminal, $V_{D2S2}$ (or $V_{914-913}$), is positive and as long as the voltage rise from the source terminal to the gate terminal, $V_{G2S2}$ (or $V_{912-913}$), remains above a cutoff threshold voltage, $V_{cutoff}$, which is around −3V. Once $V_{G2S2}$ (or $V_{912-913}$) reaches $v_{cutoff}$, the channel of MOSFET Q22 is restricted and current flow $i_{D2}$ is limited. R21 functions as a current to voltage conversion network. As a result, when current flow $i_{D2}$ increases through node 913 into R21, $V_{G2S2}$ (or $V_{912-913}$) decreases according to the basic relation $V_{G2S2}=-V_{S2G2}=-i_{D2}\times R21$. Thus, increases in current $i_{D2}$ bring about decreases in voltage $V_{G2S2}$ (or $V_{912-913}$) which eventually cause MOSFET Q22 to limit the current in the channel.

The following equations describe the relationship between some current and voltage values in current limiting filters 700' and 800':
From Kirchoff's Voltage Law (KVL):

$$V_{G1S1}=-V_{G2S2} \quad \text{Eq. 1}$$

From Kirchoff's Voltage Law (KVL):

$$V_{913-912}=-V_{912-913} \quad \text{Eq. 2}$$

Current limiting filters 700' and 800' function bi-directionally because the drain to source currents, $i_{D1}$ and $i_{D2}$, in MOSFETs M21 and M22, respectively, are inversely related. Furthermore, current limiting filters 700' and 800' function bi-directionally because the gate to source voltages, $V_{G1S1}$ and $V_{G2S2}$, of MOSFETs M21 and M22, respectively, are inversely related as shown in Eq. 1 and correspondingly shown in Eq. 2. When two variables are inversely related, increases in a first variable are related to decreases in the second variable and increases in the second variable are related to decreases in the first variable. These inverse relations cause one MOSFET to be conducting and one MOSFET to limit the current amplitude.

The configuration of circuit elements in current limiting filters 700' and 800' is designed to limit current flow between node 911 and node 914 regardless of whether current flows into node 911 and out of node 914 or current flows into node 914 and out of node 911. In the first case where current flows into node 911 and out of node 914, the channel of MOSFET Q22 will be conducting because the current $i_{D1}$ flows from node 912 through R21 to node 913 such that $V_{G2S2}=-V_{G1S1}=-i_{D2}\times R21$, $i_{D1}>0$, R21>0, and $V_{G2S2}>0V>-3V$. As a result, nearly all the current entering node 912 goes through the channel of MOSFET Q22 or parasitic diode D22 into node 914. When current $i_{D1}$ is at low levels, the channel of MOSFET Q21 is conducting. As current $i_{D1}$ increases, eventually $V_{G1S1}=-i_{D1}\times R21$ reaches $V_{cutoff}=-3V$, MOSFET Q21 with R21 form a current limiter. Further increases in $V_{911-914}$ will increase MOSFET Q21's $V_{D1S1}$ without increasing $i_{D1}$.

In the second case where current flows into node 914 and out of node 911, the channel of MOSFET Q21 will be conducting because the current $i_{D2}$ flows from node 913 through R21 to node 912 such that $V_{G1S1}=-V_{G2S2}=i_{D2}\times R21$, $i_{D2}>0$, R21>0, and $V_{G1S1}>0V>-3V$. As a result, nearly all the current entering node 913 goes through the channel of MOSFET Q21 and diode D21 into node 911. When current $i_{D2}$ is at low levels, the channel of MOSFET Q22 is conducting. As current $i_{D2}$ increases, eventually $V_{G2D2}=i_{D2}\times R21$ reaches $V_{cutoff}=-3V$, MOSFET Q22 with R21 form a current limiter. Further increases in $V_{914-911}$ will increase MOSFET Q22's $V_{D2S2}$ without increasing $i_{D2}$.

In order for current limiting filters 700' and 800' to act as symmetrically bi-directional current limiting filters that implement generally the same transfer function in both directions, MOSFET Q21 is the same type with similar parameters as MOSFET Q22.

Table A has the component part numbers or element values for a preferred embodiment of current limiting filters 700' and 800' as shown in FIG. 9, although various other components, different part numbers or different elements known to one of ordinary skill in the art may be substituted therein while maintaining the features of the present invention, and are considered to be well within the scope of the present invention. In the preferred embodiment, diodes D21 and D22 are implemented using the internal parasitic diode behavior of MOSFETs Q21 and Q22, respectively.

TABLE A

| Components of FIG. 9 | |
| --- | --- |
| Circuit Element(s) | Part Number or Value |
| Q21 and Q22 | Supertex DN 3525 |
| R21 | 10 ohms (Ω) |

B. Second Embodiment of a Current Limiting Filter

The second embodiment of current limiting filter 700 from FIG. 7 is shown as current limiting filter 700" in FIG. 10. Also, this same filter circuit is a second embodiment of current limiting filter 800" from FIG. 8 and is denoted as current limiting filter 800" in FIG. 10. References in this document that apply to current limiting filter 700" and to current limiting filter 800" are specified as: current limiting filters 700" and 800". Current limiting filter 700" may be used twice in the first filter stage 701 of two-stage filter system 300y' as shown in FIG. 7. In addition, current limiting filter 700" may be used twice in the first filter stage 701 of four-stage filter system 300y" as shown in FIG. 8. In one use of current limiting filter 700" as shown in FIG. 10, the filter's first port is connected to tip wire 513a while the filter's second port is connected to intermediate node 714a. In another use of current limiting filter 700" as shown in FIG. 10, the filter's first port is connected to ring wire 513b while the filter's second port is connected to intermediate node 714b.

Current limiting filter 800" may be used twice in the third filter stage 803 of four-stage filter system 300y" as shown in FIG. 8. In one use of current limiting filter 800" as shown in FIG. 10, the filter's first port is connected to intermediate node 815a while the filter's second port is connected to intermediate node 816a. In another use of current limiting filter 800" as shown in FIG. 10, the filter's first port is connected to intermediate node 815b while the filter's second port is connected to intermediate node 816b.

Current limiting filters 700" and 800" are similar to current limiting filters 700' and 800' except that an inductor L31 is added to current limiting filters 700" and 800" to add frequency dependent behavior to the filters. Current limiting filters 700" and 800" comprise integral body diode D31, diode D32, resistor R31, inductor L31, MOSFET Q31, and MOSFET Q32. Diode D31 has its cathode connected to node 1011 and its anode connected to node 1012. Diode D32 has its anode connected to node 1013 and its cathode connected to node 1014. Resistor R31 is connected between node 1012 and node 1015, and inductor L31 is connected between node 1015 and node 1013. MOSFET Q31 is an n-type, depletion mode MOSFET with its substrate or body terminal connected to its source terminal. MOSFET Q31 has its gate terminal (G1) connected to node 1013, its source terminal (S1) connected to node 1012, and its drain terminal (D1) connected to node 1011. MOSFET Q32 is an n-type, depletion mode MOSFET with its substrate or body terminal connected to its source terminal. MOSFET Q32 has its gate terminal (G2) connected to node 1012, its source terminal (S2) connected to node 1013, and its drain terminal (D2) connected to node 1014. Also, node 1011 is the first port of current limiting filters 700" and 800" while node 1014 is the second port of current limiting filters 700" and 800".

The impedance, $Z_L$, of inductor L31 with inductance L is given by the function $j\omega L$ where $\omega$ is the frequency of the signal passed through inductor L31. Because the impedance of inductor L31 is directly related to frequency, increases in the frequency of signals passed through inductor L31 result in increased impedance $Z_L$ for inductor L31. Since resistor R31 is in series with inductor L31, the two impedance values add to calculate the impedance between node 1012 and node 1013 ($Z_{1012-1013}=R31+Z_L=R31+j\omega L$). In contrast to the use of resistor R31 in the equations associated current limiting filters 700' and 800' as shown in FIG. 9, the corresponding equations use impedance $Z_{1012-1013}$ for current limiting filters 700" and 800" in FIG. 10.

As a depletion mode MOSFET, the channel of MOSFET Q31 is normally conducting so that current $i_{D1}$ flows from the drain terminal (node 1011) to the source terminal (node 1012) when the voltage rise from source terminal to drain terminal, $V_{D1S1}$ (or $V_{1011-1012}$), is positive and as long as the voltage rise from the source terminal to the gate terminal, $V_{G1S1}$ (or $V_{1013-1012}$), remains above a cutoff threshold voltage, $V_{cutoff}$ which is around −3V. Once $V_{G1S1}$ (or $V_{1013-1012}$) reaches $V_{cutoff}$, MOSFET Q31 with $Z_{1012-1013}$ form a current limiter. Further increases in $V_{1011-1014}$ will increase MOSFET Q31's $V_{D1S1}$ without increasing $i_{D1}$. R31 and L31 function as a load or load network for current flow $i_{D1}$. As a result, when current flow $i_{D1}$ increases through node 1012 into R31 and L31, $V_{G1S1}$ (or $V_{1013-1012}$) decreases according to the basic relation $V_{G1S1}=-V_{S1G1}=-i_{D1} \times Z_{1012-1013}$. Thus, increases in current $i_{D1}$ bring about decreases in voltage $V_{G1S1}$ (or $V_{1013-1012}$) which eventually cause MOSFET Q31 to limit the current in the channel.

Similarly, as a depletion mode MOSFET, the channel of MOSFET Q32 is normally conducting so that current $i_{D2}$ flows from the drain terminal (node 1014) to the source terminal (node 1013) when the voltage rise from source terminal to drain terminal, $V_{D2S2}$ (or $V_{1014-1013}$), is positive and as long as the voltage rise from the source terminal to the gate terminal, $V_{G2S2}$ (or $V_{1012-1013}$), remains above a cutoff threshold voltage, $V_{cutoff}$, which is around −3V. Once $V_{G2S2}$ (or $V_{1012-1013}$) reaches $V_{cutoff}$, MOSFET Q32 with $Z_{1012-1013}$ form a current limiter. Further increases in $V_{1014-1011}$ will increase MOSFET Q32's $V_{D2S2}$ without increasing $i_{D2}$. R31 and L31 function as a frequency dependent current-to-voltage conversion network. When current flow $i_{D2}$ increases through node 1013 into R31 and L31, $V_{G2S2}$ (or $V_{1012-1013}$) decreases according to the basic relation $V_{G2S2}=-V_{S2G2}=-i_{D2} \times Z_{1012-1013}$. Thus, increases in current $i_{D2}$ bring about decrease in voltage $V_{G2S2}$ (or $V_{1012-1013}$) which eventually cause MOSFET Q32 to limit the current in the channel.

The following equations describe the relationship between some current and voltage values in current limiting filters 700" and 800":

From Kirchoffs Current Law (KCL):

$$i_{D1}=-i_{D2} \qquad \text{Eq. 3}$$

From Kirchoff's Voltage Law (KVL):

$$V_{G1S1}=-V_{G2S2} \qquad \text{Eq. 4}$$

From Kirchoff's Voltage Law (KVL):

$$V_{1013-1012}=-V_{1012-1013} \qquad \text{Eq. 5}$$

Current limiting filters 700" and 800" function bi-directionally because the drain to source currents, $i_{D1}$ and $i_{D2}$, in MOSFETs M31 and M32, respectively, are inversely related as shown in Eq. 3. Furthermore, current limiting filters 700" and 800" function bi-directionally because the gate to source voltages, $V_{G1S1}$ and $V_{G2S2}$, of MOSFETs M31 and M32, respectively, are inversely related as shown in Eq. 4 and correspondingly shown in Eq. 5. When two variables are inversely related, increases in a first variable are related to decreases in the second variable and increases in the second variable are related to decreases in the first variable. These inverse relations cause one MOSFET to be conducting and one MOSFET to limit the current amplitude.

The configuration of circuit elements in current limiting filters 700" and 800" is designed to limit current flow between node 1011 and node 1014 regardless of whether current flows into node 1011 and out of node 1014 or current flows into node 1014 and out of node 1011. In the first case where current flows into node 1011 and out of node 1014, the channel of MOSFET Q32 will be conducting because the current $i_{D1}$ flows from node 1012 through R31 and L31 to node 1013 such that $V_{G2S2}=-V_{G1S1}=i_{D1} \times Z_{1012-1013}$, $i_{D1}>0$, R31>0, L31>0, and $V_{G2S2}>0$V$>-3$V. As a result, nearly all the current entering node 1013 goes through the channel of MOSFET Q32 and parasitic diode D32 into node 1014. When current $i_{D1}$ is at low levels, the channel of MOSFET Q31 is conducting. As current $i_{D1}$ increases, eventually $V_{G1S1}=-i_{D1} \times Z_{1012-1013}$ reaches $V_{cutoff}=-3$V and the channel of MOSFET Q31 limits the current amplitude.

In the second case where current flows into node 1014 and out of node 1011, the channel of MOSFET Q31 will be conducting because the current $i_{D2}$ flows from node 1013 through R31 and L31 to node 1012 such that $V_{G1S1}=-V_{G2S2}=i_{D2} \times Z_{1012-1013}$, $i_{D2}>0$, R31>0, L31>0, and $V_{G1S1}>0$V$>-3$V. As a result, nearly all the current entering node 1012 goes through the channel of MOSFET Q31 and diode D31 into node 1011. When current $i_{D2}$ is at low levels, the channel of MOSFET Q32 is conducting. As current $i_{D2}$ increases, eventually $V_{G2S2}=-i_{D2} \times Z_{1012-1013}$ reaches $V_{cutoff}=-3$V and the channel MOSFET Q32 limits the current amplitude.

In order for current limiting filters 700" and 800" to act as symmetrically bi-directional current limiting filters that implement generally the same transfer function in both directions, MOSFET, Q31 and Q32 are the same type with similar parameters.

Table B has the component part numbers or element values for a preferred embodiment of current limiting filters 700" and 800" as shown in FIG. 10, although various other components, different part numbers or different elements known to one of ordinary skill in the art may be substituted therein while maintaining the features of the present invention, and are considered to be well within the scope of the present invention. In the preferred embodiment, diodes D31 and D32 are implemented using the internal parasitic diode behavior of MOSFETs Q31 and Q32, respectively.

TABLE B

Components of FIG. 10

| Circuit Element(s) | Part Number or Value |
| --- | --- |
| L31 | 4 milli H |
| Q31 and Q32 | Supertex DN 3525 |
| R31 | 10 ohms (Ω) |

C. Third Embodiment of a Current Limiting Filter

The third embodiment of current limiting filter 700 from FIG. 7 is shown as current limiting filter 700''' in FIG. 11. Also, this same filter circuit is a third embodiment of current limiting filter 800 from FIG. 8 and is denoted as current limiting filter 800''' in FIG. 11. References in this document that apply to current limiting filter 700''' and to current limiting filter 800''' are specified as: current limiting filters 700''' and 800'''. Current limiting filter 700''' may be used twice in the first filter stage 701 of two-stage filter system 300y' as shown in FIG. 7. In addition, current limiting filter 700''' may be used twice in the first filter stage 701 of four-stage filter system 300y'' as shown in FIG. 8. In one use of current limiting filter 700''' as shown in FIG. 11, the filter's first port is connected to tip wire 513a while the filter's second port is connected to intermediate node 714a. In another use of current limiting filter 700''' as shown in FIG. 11, the filter's first port is connected to ring wire 513b while the filter's second port is connected to intermediate node 714b.

Current limiting filter 800''' may be used twice in the third filter stage 803 of four-stage filter system 300y'' as shown in FIG. 8. In one use of current limiting filter 800''' as shown in FIG. 11, the filter's first port is connected to intermediate node 815a while the filter's second port is connected to intermediate node 816a. In another use of current limiting filter 800''' as shown in FIG. 11, the filter's first port is connected to intermediate node 815b while the filter's second port is connected to intermediate node 816b.

Current limiting filters 700''' and 800''' are similar to current limiting filters 700' and 800' except that resistor R21 in FIG. 5 is replaced by an inductor network, and zener diodes are added to current limiting filters 700''' and 800'''. These changes add frequency dependent behavior to current limiting filters 700''' and 800'''. Current limiting filters 700''' and 800''' comprise diode D41, diode D42, inductor L41, inductor L42, inductor L43, zener diode Z41, zener diode Z42, zener diode Z43, zener diode Z44, MOSFET Q41, and MOSFET Q42. In addition, the inductor windings are coupled with mutual inductance M41 between inductor L41 and inductor L43 and with mutual inductance M42 between inductor L42 and inductor L43. Diode D41 has its cathode connected to node 1111 and its anode connected to node 1112. Diode D42 has its anode connected to node 1113 and its cathode connected to node 1114. Inductor L41 is connected between node 1113 and node 1115. Inductor L42 is connected between node 1112 and node 1116. Inductor L43 is connected between node 1112 and node 1113. The windings of inductor L41 are coupled to the windings of inductor L43 through mutual inductance M41 so that a positive voltage from node 1112 to node 1113 ($V_{1113\text{-}1112} > 0$) across inductor L43 results in a positive voltage from node 1113 to node 1115 ($V_{1115\text{-}1113} > 0$) across inductor L41. Similarly, the windings of inductor L42 are coupled to the windings of inductor L43 through mutual inductance M42 so that a positive voltage from node 1112 to node 1113 ($V_{1113\text{-}1112} > 0$) across inductor L43 results in a positive voltage from node 1116 to node 1112 ($V_{1112\text{-}1116} > 0$) across inductor L42.

The zener diodes are connected in the pairs Z41-Z42 and Z43-Z44. Zener diode Z41 has its anode connected to node 1112 and its cathode connected to the cathode of zener diode Z42 which has its anode connected to node 1115. Zener diode Z43 has its anode connected to node 1116 and its cathode connected to the cathode of zener diode Z44 which has its anode connected to node 1113. MOSFET Q41 is an n-type, depletion mode MOSFET with its substrate or body terminal connected to its source terminal. MOSFET Q41 has its gate terminal (G1) connected to node 1115, its source terminal (S1) connected to node 1112, and its drain terminal (D1) connected to node 1111. MOSFET Q42 is an n-type, depletion mode MOSFET with its substrate or body terminal connected to its source terminal. MOSFET Q42 has its gate terminal (G2) connected to node 1116, its source terminal (S2) connected to node 1113, and its drain terminal (D2) connected to node 1114. Also, node 1111 is the first port of current limiting filters 700''' and 800''' while node 1114 is the second port of current limiting filters 700''' and 800'''.

The voltage imparted on L43 due to drain current Q41 or Q42 is multiplied by the turns ratio at L41 and L42. Thus, total voltage (linear sum) L43 ($V_{1112\text{-}1113}$) plus voltage L41 ($V_{1113\text{-}1115}$) is applied between Q41 source and gate terminals to limit the current through Q41. Similarly, Q42 uses L43 and L42 to create Q42 source-to-gate voltage based upon the current through Q42.

The pairs of zener diodes (Z41-Z42 and Z43-Z44) are connected to form bidirectional voltage limiters or clipper functions. The pair of zener diodes Z41 and Z42 will act to keep the voltage between node 1112 and node 1115 within a certain range to prevent gate-to-source overvoltage of Q41. Similarly, the pair of zener diodes Z43 and Z44 will act to keep the voltage between node 1113 and node 1116 within a certain range to prevent gate-to-source overvoltage of Q42.

MOSFET Q41 and MOSFET Q42 in current limiting filters 700''' and 800''' function similarly to MOSFET Q31 and MOSFET Q32 in current limiting filters 700'' and 800''. As a depletion mode MOSFET, the channel of MOSFET Q41 is normally conducting so that current $i_{D1}$ flows from the drain terminal (node 1111) to the source terminal (node 1112) when the voltage rise from source terminal to drain terminal, $V_{D1S1}$ (or $V_{1111\text{-}1112}$), is positive and as long as the voltage rise from the source terminal to the gate terminal, $V_{G1S1}$ (or $V_{1115\text{-}1112}$), remains above a cutoff threshold voltage, $V_{cutoff}$, which is around minus 3V. Once $V_{G1S1}$ (or $V_{1115\text{-}1112}$) reaches $V_{cutoff}$, the channel of MOSFET Q41 is restricted and current flow $i_{D2}$ is limited. Inductors L41, L42, and L43 function as a current to voltage conversion network. As a result, when current flow $i_{D1}$ increases through node 1112 into inductor L43, the frequency-dependent impedance of the inductor L43 causes $V_{G1S1}$ (or $V_{1115\text{-}1112}$) to decrease. Additionally, L43 is mutually coupled to L41. $I_D$ through L43, induces the voltage in L41. Voltages across L43 add with induced voltage L41 to effect a multiplicative effect, by the turns ratio n, to cause $V_{G1S1}$ to decrease. For tightly magnetic coupled inductors L41, L42 and L43, the coefficient of magnetic coupling is very nearly unity. The ratio n is defined by:

$$n = \sqrt{L41/L43} = \sqrt{L42/L43} \qquad \text{Eq. 6}$$

Similarly, as a depletion mode MOSFET, the channel of MOSFET Q42 is normally conducting so that current $i_{D2}$ flows from the drain terminal (node 1114) to the source terminal (node 1113) when the voltage rise from source terminal to drain terminal, $V_{D2S2}$ (or $V_{1114\text{-}1113}$), is positive and as long as the voltage rise from the source terminal to the gate terminal, $V_{G2S2}$ (or $V_{1116\text{-}1113}$), remains above a cutoff threshold voltage, $V_{cutoff}$, which is around minus 3V. Once $V_{G2S2}$ (or $V_{1116-1113}$) reaches $V_{cutoff}$, the channel of MOSFET Q42 is restricted and current flow $i_{D2}$ is limited. Inductors L41, L42 and L43 function as a current to voltage conversion network. As a result, when current flow $i_{D2}$ increases through node 1113 into inductor L43, the frequency-dependent impedance of the inductor L43 causes $V_{G2S2}$ (or $V_{1116-1113}$) to decrease. Mutual coupling between L41 and L42 similarly causes $V_{G2S2}$ to decrease by a multiplicative amount equal to the effective turns ratio plus one.

The following equations describe the relationship between some current and voltage values in current limiting filters 700''' and 800''':

From Kirchoff's Current Law (KCL):

$$i_{D1} - i_{D2} \qquad \text{Eq. 7}$$

From Kirchoff's Voltage Law (KVL):

$$V_{G1S1} = V_{1115-1112} = V_{1115-1113} + V_{1113-1112} \qquad \text{Eq. 8}$$

From the mutual inductance of L41 and L43:

$$V_{1115-1113} = N41 \times V_{1113-1112} \qquad \text{Eq. 9}$$

Substituting Eq. 9 into Eq. 8:

$$V_{G1S1} = (N41 \times V_{1113-1112}) + V_{1113-1112} \qquad \text{Eq. 10}$$

Regrouping terms:

$$V_{G1S1} = (N41+1) \times (V_{1113-1112}) \qquad \text{Eq. 11}$$

From Kirchoff's Voltage Law (KVL):

$$V_{G2S2} = V_{1116-1113} = V_{1116-1112} + V_{1112-1113} \qquad \text{Eq. 12}$$

From the mutual inductance of L42 and L43:

$$V_{1116-1112} = N42 \times V_{1112-1113} \qquad \text{Eq. 13}$$

Substituting Eq. 13 into Eq. 12:

$$V_{G2S2} = (N42 \times V_{1112-1113}) + V_{1112-1113} \qquad \text{Eq. 14}$$

Regrouping terms:

$$V_{G2S2} = (N42+1) \times V_{1112-1113} \qquad \text{Eq. 15}$$

From Kirchoff's Voltage Law (KVL):

$$V_{1113-1112} = -V_{1112-1113} \qquad \text{Eq. 16}$$

Combining Eq 11, Eq. 14, and Eq. 16:

$$V_{G1S1} = -[(N41+1)/(N42+1)] \times V_{G2S2} \qquad \text{Eq. 17}$$

Simplified version of Eq. 17 when N41=N42:

$$\text{when } N41=N42, V_{G1S1} = -V_{G2S2} \qquad \text{Eq. 18}$$

Current limiting filters 700''' and 800''' function bi-directionally because the drain to source currents, $i_{D1}$ and $i_{D2}$, in MOSFETs M41 and M42, respectively, are inversely related as shown in Eq. 7. Furthermore, current limiting filters 700''' and 800''' function bi-directionally because the gate to source voltages, $V_{G1S1}$ and $V_{G2S2}$, of MOSFETs M41 and M42, respectively, are inversely related as shown in Eq. 17 and Eq. 18. When two variables are inversely related, increases in a first variable are related to decreases in the second variable and increases in the second variable are related to decreases in the first variable. These inverse relations cause one MOSFET to be conducting and one MOSFET to limit the current amplitude.

The configuration of circuit elements in current limiting filters 700''' and 800''' is designed to limit current flow between node 1111 and node 1114 regardless of whether current flows into node 1111 and out of node 1114 or current flows into node 1114 and out of node 1111.

In the first case, where current flows into node 1111 and out of node 1114, the channel of MOSFET Q42 will be conducting because $V_{G2S2}$ is positive ($V_{G2S2}$>0V>−3V). When the current flows from node 1112 through L43 to node 1113, voltage $V_{1112-1113}$>0V induces voltage $V_{1116-1112}$>0V between node 1116 and node 1112. ($V_{1116-1112} = N42 \times V_{1112-1113}$, N42>0, and $V_{1112-1113}$>0V imply $V_{1116-1112}$>0V. Also, ($V_{G2S2} = V_{1116-1112} + V_{1112-1113}$, $V_{1116-1112}$>0V, and $V_{1112-1113}$>0V imply $V_{G2S2}$>0V>−3V.) As a result, current entering node 1113 passes unrestricted through the channel of MOSFET Q42 and parallel forward-biased diode D42 into node 1114. In contrast, when the current is at low levels, the channel of MOSFET Q41 is conducting, but as current increases, eventually $V_{G1S1}$ reaches $V_{cutoff}$=−3V and MOSFET Q41 limits the current in the channel. The value of the voltage, $V_{G1S1}$, reaches $V_{cutoff}$ sooner at higher frequencies because of the frequency-dependent impedance behavior of inductor L43 and the voltage multiplication effect of L41 through its effective turns ratio, N41.

Diode D41 is a parasitic diode formed in the manufacture of Q41, with its cathode connected to node 1111 and its anode connected to node 1112. Consequently, when current flows into node 1111 and out of node 1114, once MOSFET Q41 limits the current amplitude, the only current increase will be diode D41's reverse leakage current.

In the second case where current flows into node 1114 and out of node 1111, the channel of MOSFET Q41 will be conducting because $V_{G1S1}$ is positive ($V_{G1S1}$>0V>−3V). When the current flows from node 1113 through L43 to node 1112, voltage $V_{1113-1112}$>0V induces voltage $V_{1115-1113}$>0V between node 1115 and node 1113. ($V_{1115-1113} = N41 \times V_{1113-1112}$, N41>0, and $V_{1113-1112}$>0V imply $V_{1115-1113}$>0V. Also, $V_{G1S1} = V_{1115-1113} + V_{1113-1112}$, $V_{1115-1113}$>0V, and $V_{1113-1112}$>0V imply $V_{G1S1}$>0V>−3V.) As a result, current entering node 1112 passes unrestricted through the channel of MOSFET Q41 and parallel forward-biased diode D41 into node 1111. In contrast, when the current is at low levels and low frequency, the channel of MOSFET Q42 is conducting, but as current and frequency increase, eventually $V_{G2D2}$ reaches $V_{cutoff}$=−3V and MOSFET Q42 limits the current in the channel. The value of the voltage, $V_{G2S2}$, reaches $V_{cutoff}$ sooner at higher frequencies because of the frequency-dependent impedance behavior of inductor L43 and the multiplication effect of L42 through its effective turns ratio, N42.

Diode D42 is a parasitic diode formed in the manufacture of Q42, with its cathode connected to node 1114 and its anode connected to node 1113. Consequently, when current flows into node 1114 and out of node 1111, once MOSFET Q42 limits the current amplitude, the only current increase will be diode D42's reverse leakage current.

In order for current limiting filters 700''' and 800''' to act as symmetrically bi-directional current limiting filters that implement generally the same transfer function in both directions, several circuit elements should have parameters that are generally the same as the parameters of other circuit elements. In this case, diode D41 should have generally the same parameters as diode D42. In addition, MOSFET Q41 should have generally the same parameters as MOSFET Q42. Zener diodes Z41, Z42, Z43, and Z44 should have generally the same parameters. Inductors L41 and L42 should have generally the same parameters, and N41 should generally equal N42.

Table C has the component part numbers or element values for a preferred embodiment of current limiting filters 700''' and 800''' as shown in FIG. 11, although various other components, different part numbers or different elements known to one of ordinary skill in the art may be substituted therein while maintaining the features of the present invention, and are considered to be well within the scope of the present invention. In the preferred embodiment, zener diodes Z41 and Z42 are designed to clamp $V_{1112-1115}$ between +12V and −12V, while zener diodes Z43 and Z44 are designed to clamp $V_{1113-1116}$ between +12V and −12V. Diodes D41 and D42 are the internal parasitic diodes of MOSFETs Q41 and Q42, respectively.

TABLE C

Components of FIG. 11

| Circuit Element(s) | Part Number or Value |
|---|---|
| D41 and D42 | Parasitic to Q41 and Q42 |
| L43 | 2 mH |
| N41 and N42 | 10 times N43 |
| Q41 and Q42 | Supertex DN 3525 |
| Z41, Z42, Z43, and Z44 | Motorola P6 SMB 12 CAT 3 |

VI. Filter System Embodiments

Figure 12:
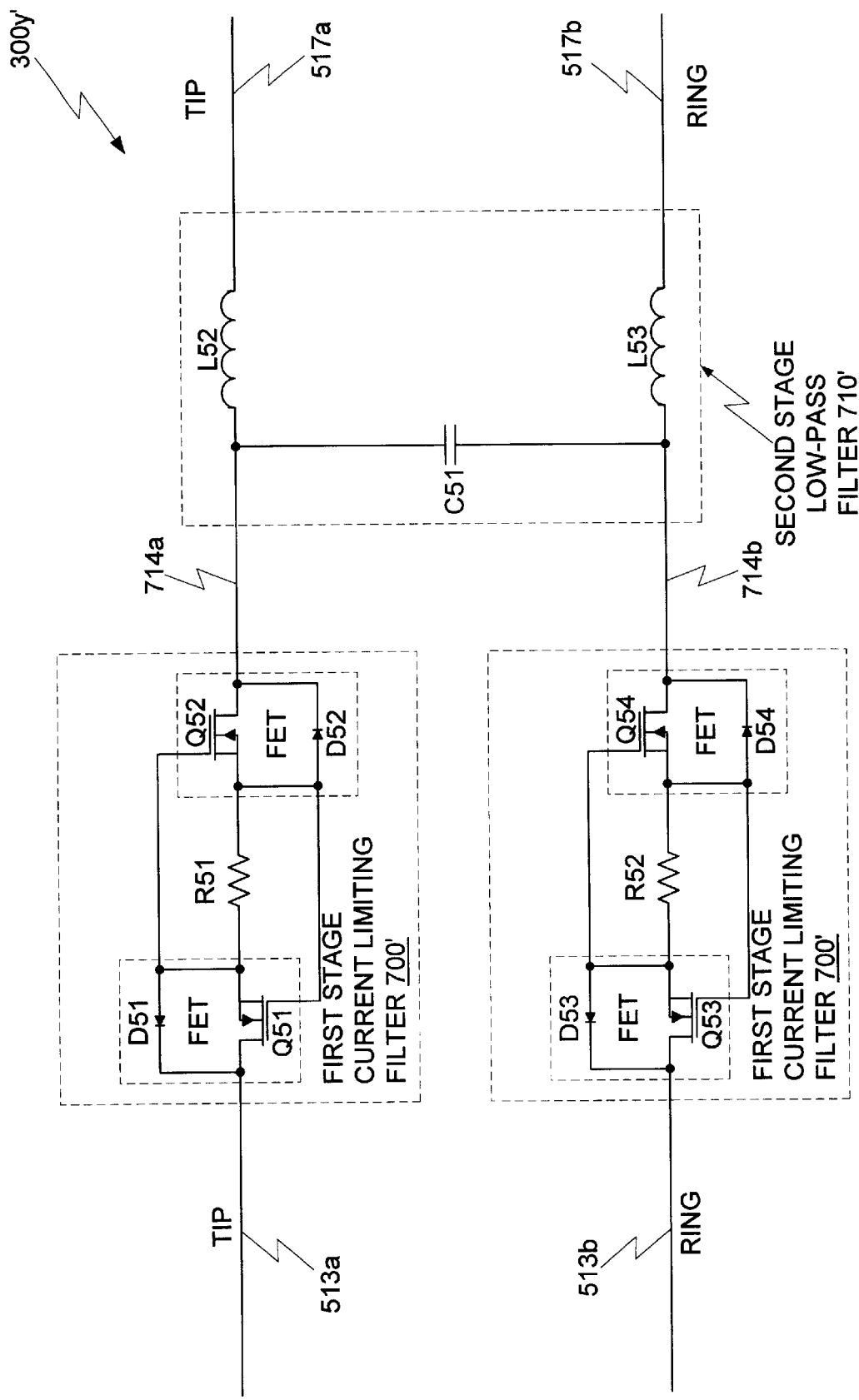
FIG. 12 is a first embodiment of a two-stage filter system from FIG. 7 and a first embodiment of a second stage low-pass filter from FIGS. 7 and 8.
Figure 13:
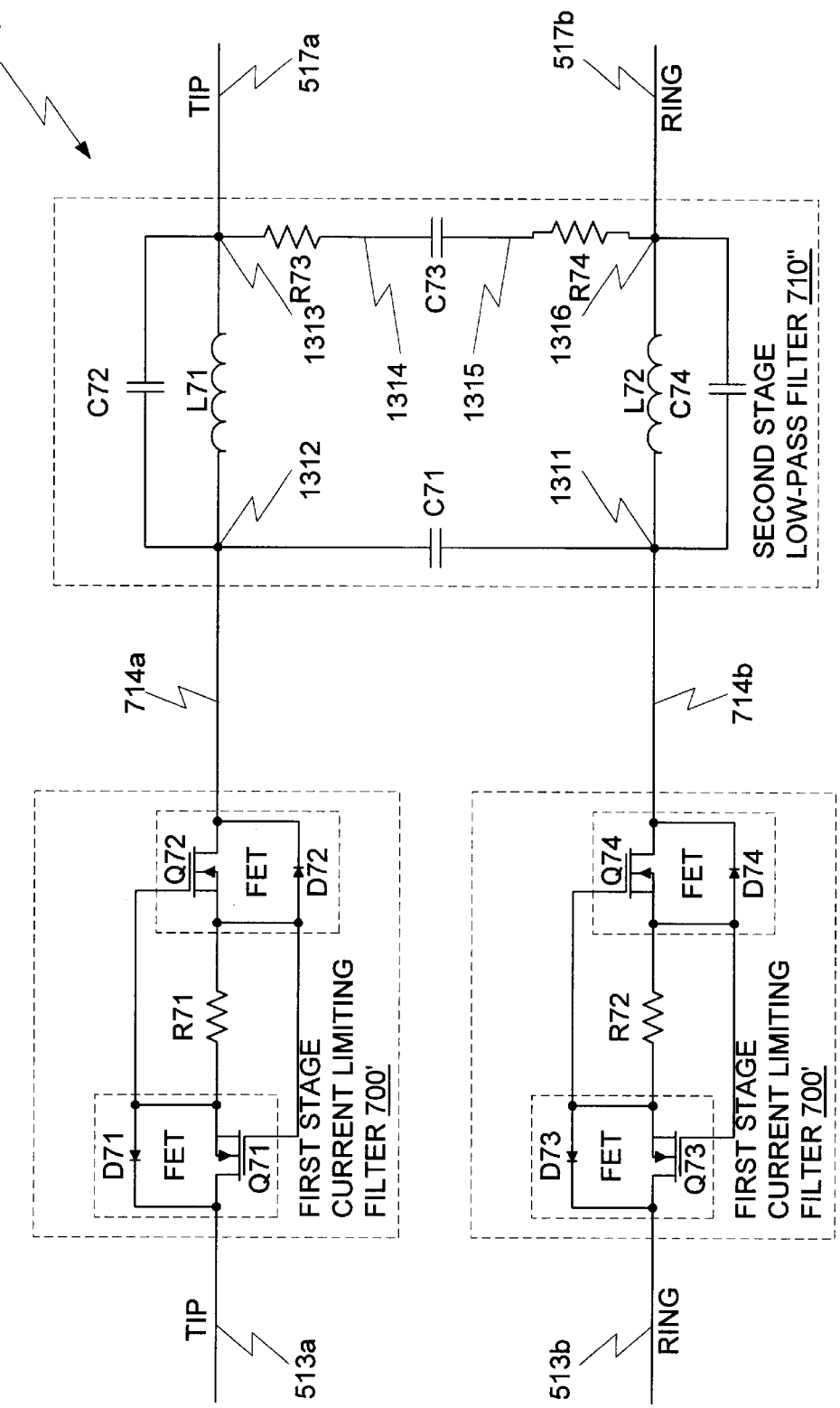
FIG. 13 is a first embodiment of a two-stage filter system from FIG. 7 and a second embodiment of a second stage low-pass filter from FIGS. 7 and 8.
Figure 14:
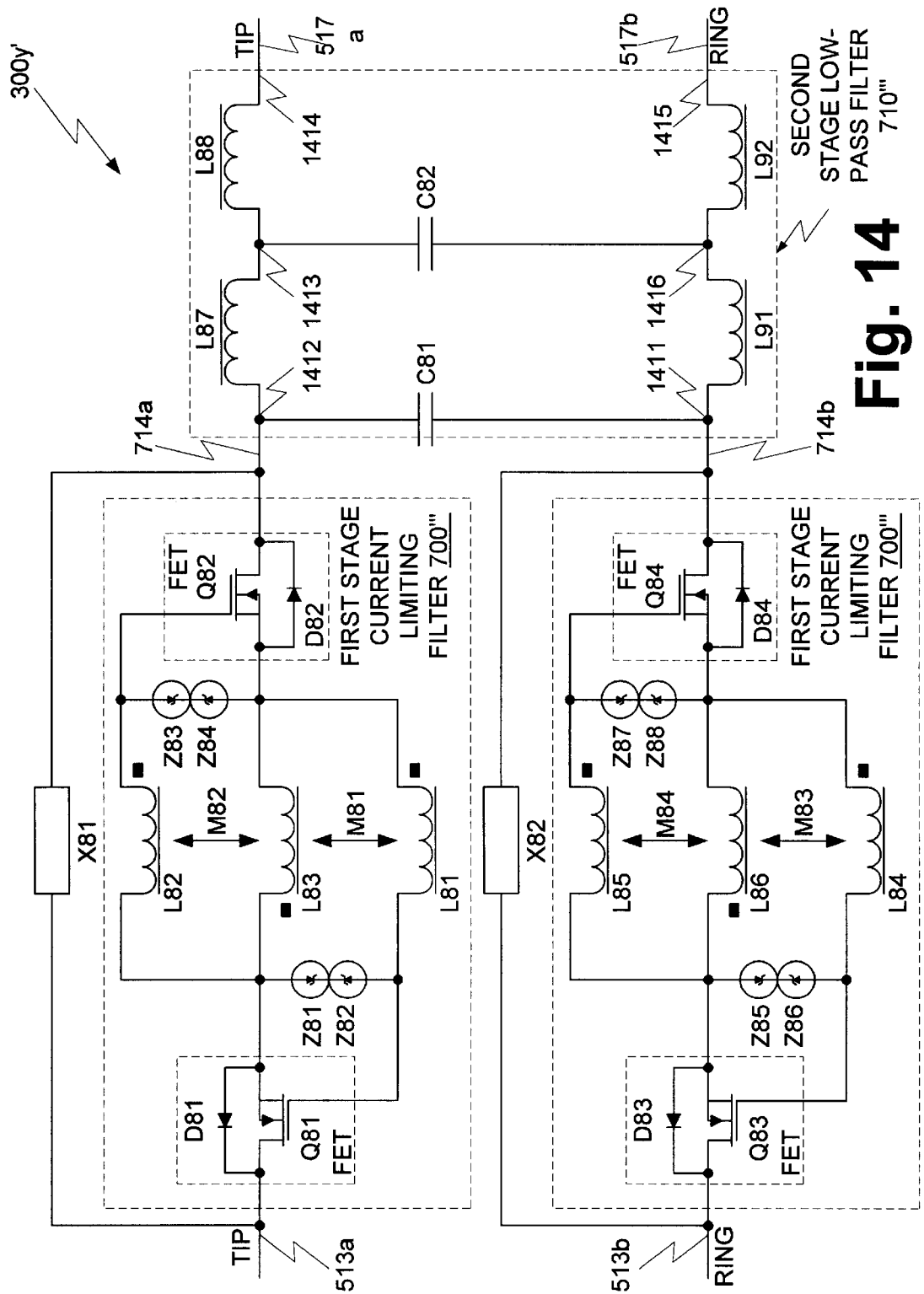
FIG. 14 is a second embodiment of a two-stage filter system from FIG. 7 and a third embodiment of a second stage low-pass filter from FIGS. 7 and 8.

FIGS. 12–14 show four different embodiments of filter system 300 either in a two-stage filter system 300y' variation or a four-stage filter system 300y''' variation. These variations on filter system 300 might use any version of current limiting filters 700 and 800 from FIGS. 9–11. Current limiting filters 700' and 800' are shown in FIG. 9. In addition, current limiting filters 700'' and 800'' are shown in FIG. 10, while current limiting filters 700''' and 800''' are shown in FIG. 11 Furthermore, FIGS. 12–14 show three variations on low-pass filters 710 and 810.

The embodiments of filter system 300 can be designed to handle some properties of a two-wire POTS transmission line including its bi-directional behavior and it insensitivity to reversal of the tip and ring wires. Each of the four different embodiments of filter system 300 shown in FIGS. 12–14 can be made symmetrically bi-directional by selecting matching parameters for some of the circuit elements. In addition, each of the four different embodiments of filter system 300 shown in FIGS. 12–14 can be made insensitive to a reversal of the tip and ring wires by matching the parameters of circuit elements in each pair of current limiting filters and by matching some of the parameters in the low-pass filter stage(s).

A. First Embodiment of a Two-Stage Filter System

FIG. 12 shows one implementation for filter system 300y in a first embodiment of two-stage filter system 300y' from FIG. 7. Although other first stage current limiting filters 700 also might be used, a pair of first stage current limiting filters 700' from FIG. 9 is shown in FIG. 12. In FIG. 12, two-stage filter system 300y' has its first terminal connected to tip wire 513a and its second terminal connected to ring wire 513b. The third terminal of two-stage filter system 300y' is connected to tip wire 517a while the fourth terminal of two-stage filter system 300y' is connected to ring wire 517b.

One first stage current limiting filter 700' has its first terminal connected to tip wire 513a and its second terminal connected to intermediate node 714a. The other first stage current limiting filter 700' has its first terminal connected to ring wire 513b and its second terminal connected to intermediate node 714b. Second stage low-pass filter 710'has its first terminal connected to intermediate node 714a and its second terminal connected to intermediate node 714b. In addition, second stage low pass filter 710' has its third terminal connected to tip wire 517a and its fourth terminal connected to ring wire 517b. Second stage low-pass filter 710' comprises capacitor C51 connected between intermediate node 714a and intermediate node 714b. Typically, inductors L52 and L53 are connected in series with the tip and ring wires to provide a high impedance. Second stage low-pass filter 710' has four terminals because the tip and ring wires run through the filter stage.

In one first stage current limiting filter 700' of FIG. 12, the filter behaves exactly as current limiting filter 700' in FIG. 9. The component values for first stage current 15 limiting filter 700' in FIG. 13 are not necessarily the same as the component values used in first stage current limiting filter 700' in FIG. 9; however, the functional behavior of the FIG. 12 elements is generally the same as the functional behavior of the FIG. 9 elements with Table D showing the mapping between FIG. 12 and FIG. 9.

TABLE D

Element functions in FIG. 12 with reference to the element functions in FIG. 9

| FIG. 12 Element | FIG. 9 Element |
|---|---|
| D51 | D21 |
| D52 | D22 |
| Q51 | Q21 |
| Q52 | Q22 |
| R51 | R21 |

In another first stage current limiting filter 700' of FIG. 12, the filter behaves 25 exactly as current limiting filter 700' in FIG. 9. The component values for first stage current limiting filter 700' in FIG. 12 are not necessarily the same as the component values used in first stage current limiting filter 700' in FIG. 9; however, the functional behavior of the FIG. 12 elements is generally the same as the functional behavior of the FIG. 9 elements with Table E showing the mapping between FIG. 12 and FIG. 9.

TABLE E

Element functions in FIG. 12 with reference to the element functions in FIG. 9

| FIG. 12 Element | FIG. 9 Element |
|---|---|
| D53 | D21 |
| D54 | D22 |
| Q53 | Q21 |
| Q54 | Q22 |
| R52 | R21 |

In order for the first embodiment of filter system 300y' in FIG. 12 to act as a symmetrically bi-directional filter that implements generally the same transfer function in both directions, several circuit elements should have parameters that are generally the same as the parameters of other circuit elements. In this case, diode D51 should have generally the same parameters as diode D52, and MOSFET Q51 should have generally the same parameters as MOSFET Q52. In addition, diode D53 should have generally the same parameters as diode D54, and MOSFET Q53 should have generally the same parameters as MOSFET Q54.

Furthermore, to make the first embodiment of filter system 300y' in FIG. 12 behave generally the same on both the tip wires 513a and 517a as well as the ring wires 513b and 517b, both first stage current limiting filters 700' should be implemented using components with generally the same parameters. In this case, diode D51 should have generally the same parameters as diode D53, and diode D52 should have generally the same parameters as diode D54. In addition, MOSFET Q51 should have generally the same parameters as MOSFET Q53, and MOSFET Q52 should have generally the same parameters as MOSFET Q54. Finally, resistor R51 should have generally the same resistance as resistor R52.

The desire to create a filter system with symmetric bi-directional behavior and symmetric behavior on the tip and ring wires leads to the following conclusions regarding the circuit elements of the first embodiment of filter system 300y' in FIG. 12. For first stage current limiting filters 700' several circuit elements should have generally the same parameters. First, the diodes D51, D52, D53, and D54 should have generally the same parameters. Second, the MOSFETs Q51, Q52, Q53, and Q54 should have generally the same parameters. Finally, the resistors R51 and R52 should be generally the same resistance.

Table F has the component part numbers or element values for a preferred first embodiment of filter system 300y' as shown in FIG. 12, although various other components, different part numbers or different elements known to one of ordinary skill in the art may be substituted therein while maintaining the features of the present invention, and are considered to be well within the scope of the present invention.

TABLE F

| Components of FIG. 12 | |
| --- | --- |
| Circuit Element(s) | Part Number or Value |
| C51 | 470 nF |
| D51, D52, D53, and D54 | Parasitic |
| Q51, Q52, Q53, and Q54 | Supertex DN 3525 |
| R51 and R52 | 10 ohms (Ω) |

B. First Embodiment of a Two-stage Filter System

FIG. 13 shows one implementation for filter system 300y in a first embodiment of two-stage filter system 300y' from FIG. 7. Although other first stage current limiting filters 700 also might be used, a pair of first stage current limiting filters 700' from FIG. 9 is shown in FIG. 13. In FIG. 13, two-stage filter system 300y' has its first terminal connected to tip wire 513a and its second terminal connected to ring wire 513b. The third terminal of two-stage filter system 300y' is connected to tip wire 517a while the fourth terminal of two-stage filter system 300y' is connected to ring wire 517b.

One first stage current limiting filter 700' has its first terminal connected to tip wire 513a and its second terminal connected to intermediate node 714a. The other first stage current limiting filter 700' has its first terminal connected to ring wire 513b and its second terminal connected to intermediate node 714b. Second stage low-pass filter 710" has its first terminal connected to intermediate node 714a and its second terminal connected to intermediate node 714b. In addition, second stage low pass filter 710" has its third terminal connected to tip wire 517a and its fourth terminal connected to ring wire 517b.

Second stage low-pass filter 710" comprises: capacitors C71, C72, C73, and C74; inductors L71 and L72; and resistors R73 and R74. Capacitor C71 is connected between node 1311, which is the second terminal of second stage low-pass filter 710", and node 1312, which is the first terminal of second stage low-pass filter 710". Capacitor C72 is connected between node 1312 and node 1313, which is the third terminal of second stage low-pass filter 710". Inductor L71 also is connected between node 1312 and node 1313. Resistor R73 is connected between node 1313 and node 1314. Capacitor C73 is connected between node 1314 and node 1315. Resistor R74 is connected between node 1315 and node 1316, which is the fourth terminal of second stage low-pass filter 710". Finally, inductor L72 is connected between node 1316 and node 1311, and capacitor C74 also is connected between node 1316 and node 1311.

In one first stage current limiting filter 700' of FIG. 13, the filter behaves exactly as current limiting filter 700' in FIG. 9. The component values for first stage current limiting filter 700' in FIG. 13 are not necessarily the same as the component values used in first stage current limiting filter 700' in FIG. 9; however, the functional behavior of the FIG. 13 elements is generally the same as the fuictional behavior of the FIG. 9 elements with Table G showing the mapping between FIG. 13 and FIG. 9.

TABLE G

| Element functions in FIG. 13 with reference to the element functions in FIG. 9 | |
| --- | --- |
| FIG. 13 Element | FIG. 9 Element |
| D71 | D21 |
| D72 | D22 |
| Q71 | Q21 |
| Q72 | Q22 |
| R71 | R21 |

In another first stage current limiting filter 700' of FIG. 13, the filter behaves exactly as current limiting filter 700' in FIG. 9. The component values for first stage current limiting filter 700' in FIG. 13 are not necessarily the same as the component values used in first stage current limiting filter 700' in FIG. 9; however, the functional behavior of the FIG. 13 elements is generally the same as the functional behavior of the FIG. 9 elements with Table H showing the mapping between FIG. 13 and FIG. 9.

TABLE H

| Element functions in FIG. 13 with reference to the element functions in FIG. 9 | |
| --- | --- |
| FIG. 13 Element | FIG. 9 Element |
| D73 | D21 |
| D74 | D22 |
| Q73 | Q21 |
| Q74 | Q22 |
| R72 | R21 |

In order for the first embodiment of filter system 300y' in FIG. 13 to act as a symmetrically bi-directional filter that implements generally the same transfer function in both directions, several circuit elements should have parameters that are generally the same as the parameters of other circuit elements. In this case, diode D71 should have generally the same parameters as diode D72, and MOSFET Q71 should have generally the same parameters as MOSFET Q72. In addition, diode D73 should have generally the same parameters as diode D74, and MOSFET Q73 should have generally the same parameters as MOSFET Q74.

Furthermore, to make the first embodiment of filter system 300y' in FIG. 13 behave generally the same on both the tip wires 513a and 517a as well as the ring wires 513b and 517b, both first stage current limiting filters 700' should be implemented using components with generally the same parameters. In this case, diode D71 should have generally the same parameters as diode D73, and diode D72 should have generally the same parameters as diode D74. In addition, MOSFET Q71 should have generally the same parameters as MOSFET Q73, and MOSFET Q72 should have generally the same parameters as MOSFET Q74. Finally, resistor R71 should have generally the same resistance as resistor R72.

Also, to make the first embodiment of filter system 300y' in FIG. 13 behave generally the same on both the tip wires 513a and 517a as well as the ring wires 513b and 517b, the second stage low-pass filter 710" should be implemented using some components with generally the same parameters. Capacitor C72 should have generally the same capacitance as capacitor C74, and inductor L71 should have generally the same inductance as inductor L72. Finally, resistor R73 should have generally the same resistance as resistor R74.

The desire to create a filter system with symmetric bi-directional behavior and symmetric behavior on the tip and ring wires leads to the following conclusions regarding the circuit elements of the first embodiment of filter system 300y' in FIG. 13. For first stage current limiting filters 700' several circuit elements should have generally the same parameters. First, the diodes D71, D72, D73, and D74 should have generally the same parameters. Second, the MOSFETs Q71, Q72, Q73, and Q74 should have generally the same parameters. Finally, the resistors R71 and R72 should be generally the same resistance.

Table I has the component part numbers or element values for a preferred first embodiment of filter system 300y' as shown in FIG. 13, although various other components, different part numbers or different elements known to one of ordinary skill in the art may be substituted therein while maintaining the features of the present invention, and are considered to be well within the scope of the present invention.

TABLE I

Components of FIG. 13

| Circuit Element(s) | Part Number or Value |
| --- | --- |
| C71 | 470 nF |
| C72 and C74 | 3.3 nF |
| C73 | 22 nF |
| D71, D72, D73, and D74 | DIN4001 |
| L71 and L72 | 8 mH |
| Q71, Q72, Q73, and Q74 | Supertex DN 3525 |
| R71 and R72 | 10 ohms (Ω) |
| R73 and R74 | 301 ohms (Ω) |

C. Second Embodiment of a Two-stage Filter System

FIG. 14 shows one implementation for filter system 300y' in a second embodiment of two-stage filter system 300y' from FIG. 7. Although other first stage current limiting filters 700 also might be used, a pair of first stage current limiting filters 700''' from FIG. 11 is shown in FIG. 14. In FIG. 14, two-stage filter system 300y' has its first terminal connected to tip wire 513a and its second terminal connected to ring wire 513b. The third terminal of two-stage filter system 300y' is connected to tip wire 517a while the fourth terminal of two-stage filter system 300y' is connected to ring wire 517b.

One first stage current limiting filter 700''' has its first terminal connected to tip wire 513a and its second terminal connected to intermediate node 714a. The other first stage current limiting filter 700''' has its first terminal connected to ring wire 513b and its second terminal connected to intermediate node 714b. Second stage low-pass filter 710''' has its first terminal connected to intermediate node 714a and its second terminal connected to intermediate node 714b. In addition, second stage low pass filter 710''' has its third terminal connected to tip wire 517a and its fourth terminal connected to ring wire 517b.

Second stage low-pass filter 710''' comprises: capacitors C81 and C82; and inductors L87, L88, L91, and L92. Capacitor C81 is connected between node 1411, which is the second terminal of second stage low-pass filter 710''', and node 1412, which is the first terminal of second stage low-pass filter 710'''. Inductor L87 is connected between node 1412 and node 1413. Inductor L88 is connected between node 1413 and node 1414, which is the third terminal of second stage low-pass filter 710'''. Inductor L92 is connected between node 1415 and node 1416. Node 1415 is the fourth terminal of two stage low-pass filter 710'''. Inductor L91 is connected between node 1416 and node 1411. Finally, capacitor C82 is connected between node 1413 and node 1416.

In one first stage current limiting filter 700''' of FIG. 14, the filter behaves exactly as current limiting filter 700".' in FIG. 11. The component values for first stage current limiting filter 700''' in FIG. 14 are not necessarily the same as the component values used in first stage current limiting filter 700''' in FIG. 11; however, the functional behavior of the FIG. 13 elements is generally the same as the functional behavior of the FIG. 11 elements with Table J showing the mapping between FIG. 14 and FIG. 11.

TABLE J

Element functions in FIG. 14 with reference to the element functions in FIG. 11

| FIG. 14 Element | FIG. 11 Element |
| --- | --- |
| D81 | D41 |
| D82 | D42 |
| L81 | L41 |
| L82 | L42 |
| L83 | L43 |
| M81 | M41 |
| M82 | M42 |
| Q81 | Q41 |
| Q82 | Q42 |
| Z81 | Z41 |
| Z82 | Z42 |
| Z83 | Z43 |
| Z84 | Z44 |

In another first stage current limiting filter 700''' of FIG. 14, the filter behaves exactly as current limiting filter 700''' in FIG. 1. The component values for first stage current limiting filter 700''' in FIG. 14 are not necessarily the same as the component values used in first stage current limiting filter 700''' in FIG. 12; however, the functional behavior of the FIG. 14 elements is generally the same as the functional behavior of the FIG. 11 elements with Table K showing the mapping between FIG. 14 and FIG. 11.

TABLE K

Element functions in FIG. 14 with reference to the element functions in FIG. 11

| FIG. 14 Element | FIG. 11 Element |
|---|---|
| D83 | D41 |
| D84 | D42 |
| L84 | L41 |
| L85 | L42 |
| L86 | L43 |
| M83 | M41 |
| M84 | M42 |
| Q83 | Q41 |
| Q84 | Q42 |
| Z85 | Z41 |
| Z86 | Z42 |
| Z87 | Z43 |
| Z88 | Z44 |

In addition to the first stage current limiting filters 700''' and the second stage low-pass filter 710''', FIG. 14 shows sidactors X81 and X82. Sidactors X81 and X82 are used for FCC Part 68 registration to handle surge protection for this third embodiment of two-stage filter system 300y'. These sidactors also could be used for surge protection on the other embodiments of filter systems 300y' and 300y'' that are shown in FIGS. 12-13. Sidactor X81 is connected between tip wire 513a and intermediate node 714a. Sidactor X82 is connected between ring wire 513b and intermediate node 714b. Sidactors X81 and X82 do not provide ring signal filtering functionality. Instead sidactors X81 and X82 are used to provide surge protection to filter system 300.

In order for the second embodiment of filter system 300y' in FIG. 14 to act as a symmetrically bi-directional filter that implements generally the same transfer function in both directions, several circuit elements should have parameters that are generally the same as the parameters of other circuit elements. In this case, diode D81 should have generally the same parameters as diode D82, and MOSFET Q81 should have generally the same parameters as MOSFET Q82. In addition, diode D83 should have generally the same parameters as diode D84, and MOSFET Q83 should have generally the same parameters as MOSFET Q84. Inductor L81 should have generally the same inductance as inductor L82, and inductor L84 should have generally the same inductance as L85. Mutual inductance M81 should be generally the same value as mutual inductance M82, and mutual inductance M83 should be generally the same value as mutual inductance M84. Zener diodes Z81, Z82, Z83, and Z84 should have generally the same parameters. Finally, zener diodes Z85, Z86, Z87, and Z88 should have generally the same parameters.

Figure 15:
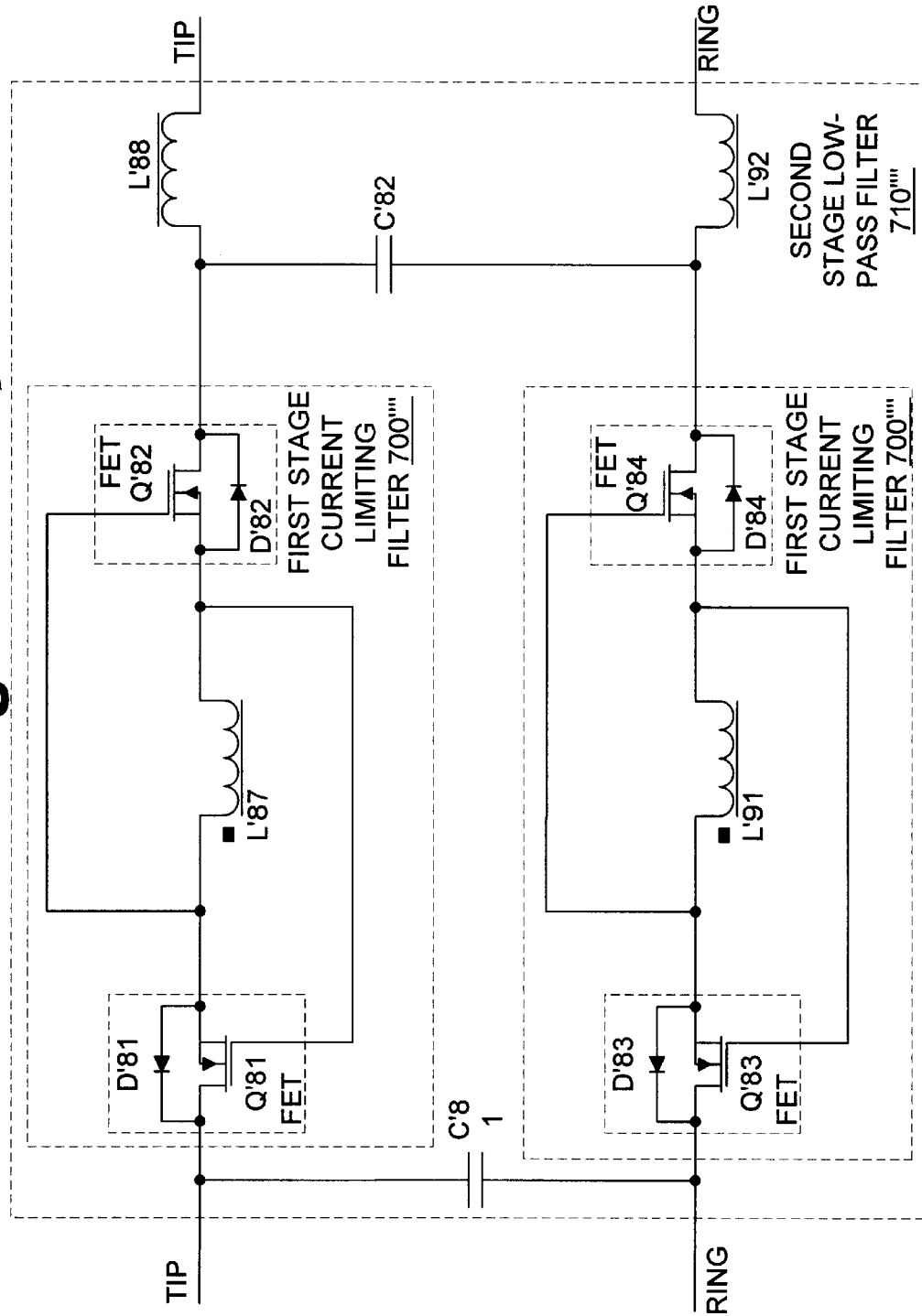
FIG. 15 is a third embodiment of a two stage filter system from FIG. 7.

Furthermore, to make the second embodiment of filter system 300y' in FIG. 15 behave generally the same on both the tip wires 513a and 517a as well as the ring wires 513b and 517b, both first stage current limiting filters 700''' should be implemented using components with generally the same parameters. In this case, diode D81 should have generally the same parameters as diode D83, and diode D82 should have generally the same parameters as diode D84. In addition, MOSFET Q81 should have generally the same parameters as MOSFET Q83, and MOSFET Q82 should have generally the same parameters as MOSFET Q84. Inductor L81 should have generally the same inductance as inductor L84, and inductor L82 should have generally the same inductance as inductor L85. Inductor L83 should have generally the same inductance as inductor L86. Mutual inductance M81 should be generally the same value as mutual inductance M83, and mutual inductance M82 should be generally the same value as mutual inductance M84. Zener diode Z81 should have generally the same parameters as zener diode Z85, and zener diode Z82 should have generally the same parameters as zener diode Z86. Zener diode Z83 should have generally the same parameters as zener diode Z87, and zener diode Z84 should have generally the same parameters as zener diode Z88. Finally, sidactor X81 should have generally the same parameters as sidactor X82.

Also, to make the second embodiment of filter system 300y' in FIG. 14 behave generally the same on both the tip wires 513a and 517a as well as the ring wires 513b and 517b, the second stage low-pass filter 710''' should be implemented using some components with generally the same parameters. Inductor L87 should have generally the same inductance as inductor L91, and inductor L88 should have generally the same inductance as inductor L92.

The desire to create a filter system with symmetric bi-directional behavior and symmetric behavior on the tip and ring wires leads to the following conclusions regarding the circuit elements of the second embodiment of filter system 300y' in FIG. 14. For first stage current limiting filters 700''' several circuit elements should have generally the same parameters. First, the diodes D81, D82, D83, and D84 should have generally the same parameters. Second, the MOSFETs Q81, Q82, Q83, and Q84 should have generally the same parameters. Next, inductors L81, L82, L84, and L85 should have generally the same inductance. Inductor L83 should have generally the same inductance as inductor L86. Mutual inductances M81, M82, M83, and M84 should be generally the same value. Zener diodes Z81, Z82, Z83, Z84, Z85, Z86, Z87, and Z88 should have generally the same parameters. Inductor L87 should have generally the same inductance as inductor L91, and inductor L88 should have generally the same inductance as inductor L92. Finally, sidactors X81 and X82 should have generally the same parameters.

Figure 16:
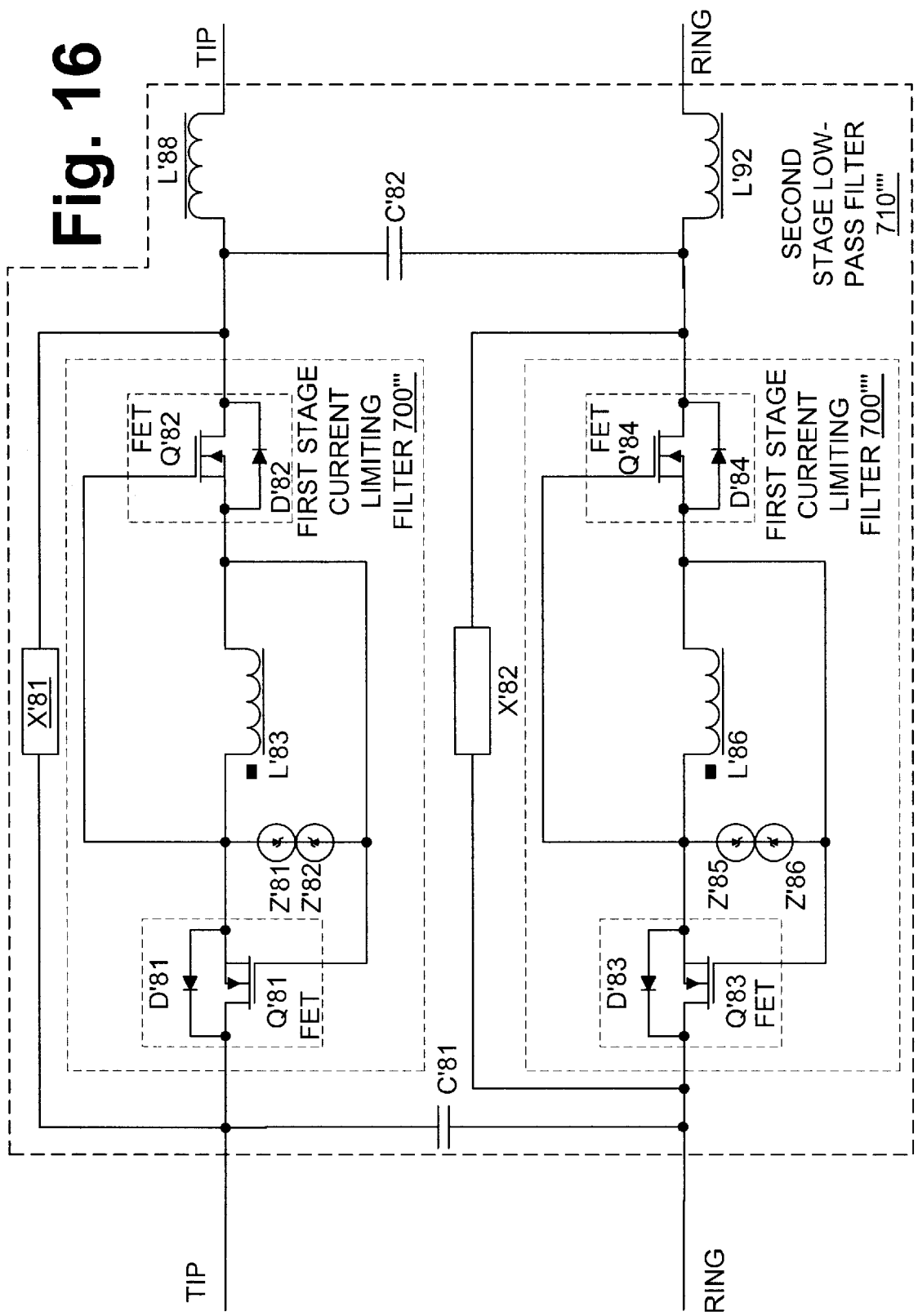
FIG. 16 is the filter of FIG. 15 with added protective circuitry.

Table L has the component part numbers or element values for a preferred second embodiment of filter system 300y' as shown in FIG. 16, although various other components, different part numbers or different elements known to one of ordinary skill in the art may be substituted therein while maintaining the features of the present invention, and are considered to be well within the scope of the present invention.

TABLE L

| Circuit Element(s) | Part Number or Value |
|---|---|
| C81 | 27 nF |
| C82 | 47 nF |
| D81, D82, D83, and D84 | Parasitic |
| L83 and L86 | 2 mH |
| L87, L88, L91, and L92 | 12 mH |
| N81 and N82 | 10 times N83 |
| N84 and N85 | 10 times N86 |
| Q71, Q72, Q73, and Q74 | Supertex DN 3525 |
| X81 and X82 | Teccor P150057 |
| Z81, Z82, Z83, Z84, Z85, Z86, Z87, and Z88 | Motorola P6SMB12 CAT3 |

D. Third Embodiment of a Two Stage Filter System

FIG. 15 shows one implementation for filter system 300y' in a second embodiment of the two-stage filter system 300 y' from FIG. 7. This third embodiment of the filter system combines the functions of the first stage current-limiting filter 700'''' into the second stage low-pass filter 710'''' in order to minimize the number of elements required to implement the present invention. This embodiment is accomplished by using elements L'87 and L'91 of the second stage low-pass filter 710''' as the frequency-selective impedance which provides the current-limiting control voltage for FETs Q'81, Q'82, Q'83 and Q'84. Whereas in the previous embodiments, where the FET gate control voltage (for example, see Q81, Q82, Q83 and Q84 of FIG. 14) was derived across a separate impedance element (for example, see L83 and L86 of FIG. 14), in this embodiment the voltages across the low-pass filter 710''' elements L'87 and L'91 themselves are used to control the FETs Q'81, Q'82, Q'83 and Q'84 current-limiting action. This third embodiment operates in a similar manner as the first and second embodiments of the present invention. Elements in FIG. 15 that are similar to those in FIG. 14 bear similar reference numerals in that elements in FIG. 15 are labeled X'xx and similar elements in FIG. 14 are labeled Xxx.

The current-limiting FETS Q'81, Q'82, Q'83 and Q'84 are controlled by the voltage developed across the choke (inductors L'87 and L'91). At currents less than the current limit value, the choke (inductors L'87 and L'91) appears unmodified (except for the on resistance of the FETs Q'81, Q'82, Q'83 and Q'84). As the current and frequency increase, inductors L'87 and L'91 will generate adequate gate voltage on FETs Q'81, Q'82, Q'83 and Q'84 to cause current-limiting to occur.

FIG. 16 includes protection devices which may be added to the embodiment shown in FIG. 15. Elements in FIG. 16 that are the same as those in FIG. 15 bear the same reference numerals. Elements in FIG. 16 that are similar to those in FIG. 14 bear similar reference numerals in that elements in FIG. 16 are labeled X'xx and similar elements in FIG. 14 are labeled Xxx. These protection devices (Z'81, Z'82, Z'85, Z'86, X'81 and X'82) prevent gate-to-source and drain-to-source breakdown of the FETs Q'81, Q'82, Q'83 and Q'84 from occurring.

VII. Modifications and Variations

It should be emphasized that the above-described embodiments of the filter system of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of the present invention and protected by the following claims.

What is claimed is:

1. A filter system that suppresses interference imposed on at least one communications channel by at least one signal component outside of a specified amplitude range, the filter system comprising:

at least one filter stage having an amplitude-dependent transfer function, the amplitude-dependent transfer function implemented using at least one bi-directional current limiting filter, the at least one bi-directional current limiting filter comprising:
a first terminal;
a second terminal, the at least one bi-directional current limiting filter suppressing current outside a first specified amplitude range when the current enters the first terminal and exits the second terminal and suppressing current outside a second specified amplitude range when the current enters the second terminal and exits the first terminal;
a first transistor having a first current carrying electrode, a second current carrying electrode, and a first control electrode activated by a first variable;
a second transistor having a third current carrying electrode, a fourth current carrying electrode, and a second control electrode activated by a second variable, the second variable being inversely related to the first variable;
a first diode having its anode connected to a first internal node and having its cathode connected to the first terminal;
a second diode having its anode connected to a second internal node and having its cathode connected to the second terminal;
the first transistor with the first control electrode, the first current carrying electrode, and the second current carrying electrode, the first control electrode being connected to a third internal node, the first current carrying electrode being connected to the first internal node, and the second current carrying electrode being connected to the first terminal;
the second transistor with the second control electrode, the third current carrying electrode, and the fourth current carrying electrode, the second control electrode being connected to a fourth internal node, the third current carrying electrode being connected to the second internal node, and the fourth current carrying electrode being connected to the second terminal; and
a load network connected to the first internal node, the second internal node, the third internal node, and the fourth internal node.

2. The filter system of claim 1, wherein the first diode is implemented using an internal parasitic diode behavior of the first transistor and the second diode is implemented using an internal parasitic diode behavior of the second transistor.

3. The filter system of claim 1, wherein the at least one signal component is filtered prior to being frequency-division multiplexed into a communications medium with the at least one communications channel.

4. The filter system of claim 1, wherein the at least one signal component is filtered prior to being frequency dependent filtered into a communications medium with the at least one communications channel.

5. The filter system of claim 3, wherein the at least one communications channel that is frequency-division multiplexed into the communications medium is a digital channel of a digital subscriber line (DSL).

6. The filter system of claim 3, wherein the communications medium is a two-wire transmission line of a subscriber loop.

7. The filter system of claim 3, wherein the communications medium is a two-wire transmission line of customer premises internal wiring.

8. The filter system of claim 3, wherein the communications medium carries a plain old telephone service (POTS) interface that comprises at least one POTS signaling function and a voice frequency (VF) channel.

9. The filter system of claim 8, wherein the at least one POTS signaling function comprises the at least one signal component that imposes interference on the at least one communications channel.

10. The filter system of claim 9, wherein the at least one signaling component is a POTS ring signal.

11. A communications system comprising:
a signal source generating at least one signal component outside of a specified amplitude range; and a filter system suppressing interference from the at least one signal component, the interference being imposed on a communications channel, the filter system comprising:
   at least one filter stage having an amplitude-dependent transfer function, the amplitude-dependent transfer function implemented using at least one bi-directional current limiting filter comprising:
      a first terminal;
      a second terminal, the at least one bi-directional current limiting filter suppressing current outside a first specified amplitude range when the current enters the first terminal and exits the second terminal and suppressing current outside a second specified amplitude range when the current enters the second terminal and exits the first terminal;
      a first transistor having a first current carrying electrode, a second current carrying electrode, and a first control electrode activated by a first variable;
      a second transistor having a third current carrying electrode, a fourth current carrying electrode, and a second control electrode activated by a second variable, the second variable being inversely related to the first variable;
      a first diode having its anode connected to a first internal node and having its cathode connected to the first terminal;
      a second diode having its anode connected to a second internal node and having its cathode connected to the second terminal;
      the first transistor with the first control electrode, the first current carrying electrode, and the second current carrying electrode, the first control electrode being connected to a third internal node, the first current carrying electrode being connected to the first internal node, and the second current carrying electrode being connected to the first terminal;
      the second transistor with the second control electrode, the third current carrying electrode, and the fourth current carrying electrode, the second control electrode being connected to a fourth internal node, the third current carrying electrode being connected to the second internal node, and the fourth current carrying electrode being connected to the second terminal; and
      a load network connected to the first internal node, the second internal node, the third internal node, and the fourth internal node.

12. The filter system of claim 11, wherein the first diode is implemented using an internal parasitic diode behavior of the first transistor and the second diode is implemented using an internal parasitic diode behavior of the second transistor.

13. The filter system of claim 11, wherein the bi-directional current limiting filter further comprises an inductor network, where the inductor network acts to implement a frequency-dependent transfer function.

14. The filter system of claim 11, wherein the at least one signal component is filtered prior to being frequency-division multiplexed into a communications medium with the at least one communications channel.

15. The filter system of claim 11, wherein the at least one signal component is filtered prior to being frequency dependent filtered into a communications medium with the at least one communications channel.

16. The filter system of claim 14, wherein the at least one communications channel that is frequency-division multiplexed into the communications medium is a digital channel of a digital subscriber line (DSL).

17. The filter system of claim 14, wherein the communications medium is a two-wire transmission line of a subscriber loop.

18. The filter system of claim 14, wherein the communications medium is a two-wire transmission line of customer premises internal wiring.

19. The filter system of claim 14, wherein the communications medium carries a plain old telephone service (POTS) interface that comprises at least one POTS signaling function and a voice frequency (VF) channel.

20. The filter system of claim 19, wherein the at least one POTS signaling function comprises the at least one signal component that imposes interference on the at least one communications channel.

21. The filter system of claim 20, wherein the at least one signaling component is a POTS ring signal.

22. A bi-directional current limiting filter comprising:
   a first terminal;
   a first internal node;
   a first diode having its anode connected to the first internal node and having its cathode connected to the first terminal;
   a second terminal;
   a second internal node;
   a second diode having its anode connected to the second internal node and having its cathode connected to the second terminal;
   a first transistor having a first current carrying electrode, a second current carrying electrode, and a first control electrode activated by a first variable,
   a second transistor having a third current carrying electrode, a fourth current carrying electrode, and a second control electrode activated by a second variable, the second variable being inversely related to the first variable; and
   a load network connected to the first internal node, the second internal node, a third internal node, and a fourth internal node,
   where the first control electrode is connected to the third internal node, the first current carrying electrode is connected to the first internal node, and the second current carrying electrode is connected to the first terminal,
   where the second control electrode is connected to the fourth internal node, the third current carrying electrode is connected to the second internal node, and the fourth current carrying electrode is connected to the second terminal.

* * * * *